United States Patent
Fujii et al.

(10) Patent No.: US 8,218,962 B2
(45) Date of Patent: Jul. 10, 2012

(54) IMAGE-CAPTURING APPARATUS

(75) Inventors: Shinichi Fujii, Osaka (JP); Norihiko Akamatsu, Osaka (JP)

(73) Assignee: Sony Corporation, Tokyo (JP)

( * ) Notice: Subject to any disclaimer, the term of this patent is extended or adjusted under 35 U.S.C. 154(b) by 897 days.

(21) Appl. No.: 12/277,412

(22) Filed: Nov. 25, 2008

(65) Prior Publication Data

US 2009/0148147 A1     Jun. 11, 2009

(30) Foreign Application Priority Data

Dec. 10, 2007   (JP) ................................. 2007-318063

(51) Int. Cl.
    *G03B 13/34* (2006.01)
(52) U.S. Cl. ..... 396/100; 396/111; 396/128; 348/222.1; 348/350
(58) Field of Classification Search ................. 396/100; 348/350
    See application file for complete search history.

(56) References Cited

U.S. PATENT DOCUMENTS

| | | | | |
|---|---|---|---|---|
| 6,781,632 B1 * | 8/2004 | Ide | ................ | 348/345 |
| 6,829,008 B1 * | 12/2004 | Kondo et al. | ................ | 348/302 |
| 7,715,703 B2 * | 5/2010 | Utagawa et al. | ................ | 396/111 |
| 7,751,700 B2 * | 7/2010 | Kusaka | ................ | 396/79 |
| 7,792,420 B2 * | 9/2010 | Kusaka | ................ | 396/79 |
| 7,822,333 B2 * | 10/2010 | Kusaka | ................ | 396/80 |
| 7,839,444 B2 * | 11/2010 | Kuruma | ................ | 348/333.01 |
| 7,873,267 B2 * | 1/2011 | Kusaka | ................ | 396/104 |
| 7,920,782 B2 * | 4/2011 | Fujii | ................ | 396/128 |
| 8,009,223 B2 * | 8/2011 | Kusaka | ................ | 348/350 |
| 8,013,921 B2 * | 9/2011 | Suzuki | ................ | 348/308 |
| 8,031,259 B2 * | 10/2011 | Suzuki | ................ | 348/350 |
| 8,036,523 B2 * | 10/2011 | Kusaka | ................ | 396/128 |
| 8,063,978 B2 * | 11/2011 | Kusaka | ................ | 348/345 |
| 8,102,433 B2 * | 1/2012 | Fujii | ................ | 348/217.1 |
| 8,111,310 B2 * | 2/2012 | Kusaka | ................ | 348/294 |
| 2007/0206940 A1 * | 9/2007 | Kusaka | ................ | 396/128 |

(Continued)

FOREIGN PATENT DOCUMENTS

JP        56-78811        6/1981

(Continued)

OTHER PUBLICATIONS

Office Action issued Oct. 25, 2011, in Japanese Patent Application No. 2007-318063.

(Continued)

*Primary Examiner* — Clayton E Laballe
*Assistant Examiner* — Bret Adams
(74) *Attorney, Agent, or Firm* — Oblon, Spivak, McClelland, Maier & Neustadt, L.L.P.

(57) ABSTRACT

An image-capturing apparatus includes an image-capturing optical system; a sensor unit having line sensors that receive light fluxes of an object, which have been transmitted through a pair of partial areas in an exit pupil of the image-capturing optical system; image-capturing elements having a pixel arrangement capable of generating an image signal and a focus detection pixel sequence, in which two or more pairs of pixels that receive the light fluxes of an object, are arranged in a predetermined direction; a continuous image-capturing unit configured to perform continuous image capturing of actually exposing the image-capturing elements; a signal generation unit configured to perform another exposure for the sensor unit; a first focus detection unit configured to perform focus detection of a phase-difference detection method; a second focus detection unit configured to perform focus detection; and a focus adjustment unit configured to perform focus adjustment.

9 Claims, 13 Drawing Sheets

U.S. PATENT DOCUMENTS

| | | | | |
|---|---|---|---|---|
| 2008/0112643 A1* | 5/2008 | Kusaka | | 382/278 |
| 2008/0259202 A1* | 10/2008 | Fujii | | 348/345 |
| 2009/0110382 A1* | 4/2009 | Fujii | | 396/128 |
| 2009/0110383 A1* | 4/2009 | Fujii | | 396/128 |

FOREIGN PATENT DOCUMENTS

| | | |
|---|---|---|
| JP | 8-43914 | 2/1996 |
| JP | 8-122863 | 5/1996 |
| JP | 2000-305010 | 11/2000 |
| JP | 2000-338393 | 12/2000 |
| JP | 2004-85843 | 3/2004 |
| JP | 2007-150643 | 6/2007 |
| JP | 2007-184840 | 7/2007 |
| JP | 2007-233035 | 9/2007 |
| JP | 2009-109631 | 5/2009 |

OTHER PUBLICATIONS

U.S. Appl. No. 12/210,589, filed Sep. 15, 2008, Fujii.

* cited by examiner

IMAGE-CAPTURING APPARATUS

CROSS REFERENCES TO RELATED APPLICATIONS

The present invention contains subject matter related to Japanese Patent Application JP 2007-318063 filed in the Japanese Patent Office on Dec. 10, 2007, the entire contents of which are incorporated herein by reference.

BACKGROUND OF THE INVENTION

1. Field of the Invention

The present invention relates to an image-capturing apparatus having an image-capturing optical system.

2. Description of the Related Art

A single-lens reflex camera (image-capturing apparatus) is configured to have a mirror unit including a main mirror and a sub-mirror that can be driven so that when the mirror unit is tilted down, object light that has been transmitted through an image-capturing lens is guided to an auto-focus (AF) module (phase-difference AF module) of a phase-difference detection method and an optical finder and also, when the mirror unit is tilted up, object light is guided to an image-capturing plane.

In continuous image capturing in such a camera, phase-difference AF using an AF module can be performed by down-driving and up-driving the mirror unit during intervals between actual exposures to an image-capturing plane and guiding object light to the AF module (see Japanese Unexamined Patent Application Publication No. 8-43914).

SUMMARY OF THE INVENTION

During continuous image capturing involving phase-difference AF in Japanese Unexamined Patent Application Publication No. 8-43914, a fixed time period is spent for driving the mirror unit, which is performed between actual exposures. As a consequence, a decrease in continuous image capturing is suppressed by performing phase-difference detection using an AF module only once. However, with such phase-difference detection being performed only once, AF control with high accuracy is difficult. This will be described with reference to FIG. 18.

FIG. 18 is a timing chart illustrating an AF operation at the time of continuous image capturing in the related art.

When continuous image capturing is started as a result of a shutter button being fully pressed, after exposure (actual exposure) P1 to an image-capturing plane, mirror down driving Kd is performed so that object light is guided to an AF module, and exposure Pa for phase-difference detection is performed. After this exposure Pa, mirror up driving Ku is performed, whereas reading Ra of exposure data from the AF module and a computation process Ma of phase-difference AF are performed, and lens driving Da to the in-focus position is performed. In such an operation during continuous capturing, the exposure Pa of the AF module and the computation process Ma of phase-difference AF are performed only once, and therefore, high-accuracy AF is difficult.

It is desirable to provide an image-capturing apparatus capable of performing phase-difference AF with high accuracy while suppressing a decrease in a continuous capturing speed.

According to an embodiment of the present invention, there is provided an image-capturing apparatus including an image-capturing optical system; a sensor unit having a pair of line sensors that receive light fluxes of an object, which have been transmitted through a pair of partial areas in an exit pupil of the image-capturing optical system; image-capturing elements having a pixel arrangement capable of generating an image signal related to object light that has been transmitted through the image-capturing optical system, and a focus detection pixel sequence, in which two or more pairs of pixels that receive the light fluxes of an object, which have been transmitted through a pair of partial areas in an exit pupil of the image-capturing optical system, are arranged in a predetermined direction; continuous image-capturing means for performing continuous image capturing of actually exposing the image-capturing elements in sequence, thereby generating the image signal in the pixel arrangement at the time of each actual exposure, and for generating a predetermined signal in the focus detection pixel sequence; signal generation means for performing another exposure for the sensor unit during intervals between actual exposures, thereby generating specific signals in the pair of line sensors; first focus detection means for performing focus detection of a phase-difference detection method on the basis of the predetermined signal generated by the actual exposure; second focus detection means for performing focus detection of the phase-difference detection method on the basis of the specific signal generated by the other exposure; and focus adjustment means for performing focus adjustment during intervals between actual exposures on the basis of a first focus detection result obtained by the first focus detection means and a second focus detection result obtained by the second focus detection means.

According to another embodiment of the present invention, there is provided an image-capturing apparatus including an image-capturing optical system; image-capturing elements having a pixel arrangement capable of generating an image signal related to object light that has been transmitted through the image-capturing optical system, and a focus detection pixel sequence, in which two or more pairs of pixels that receive light fluxes of an object that has been transmitted through a pair of partial areas in an exit pupil of the image-capturing optical system, are arranged in a predetermined direction; continuous image-capturing means for performing continuous image capturing of actually exposing the image-capturing elements in sequence, thereby generating the image signal in the pixel arrangement at the time of each actual exposure, and for generating a first signal in the focus detection pixel sequence; signal generation means for performing another exposure for the image-capturing elements during intervals between actual exposures, thereby generating a second signal in at least the focus detection pixel sequence; first focus detection means for performing focus detection of a phase-difference detection method on the basis of the first signal generated by the actual exposure; second focus detection means for performing focus detection of the phase-difference detection method on the basis of the second signal generated by the other exposure; and focus adjustment means for performing focus adjustment during intervals between actual exposures on the basis of a first focus detection result obtained by the first focus detection means and a second focus detection result obtained by the second focus detection means.

According to the embodiments of the present invention, in continuous image capturing in which image-capturing elements having a focus detection pixel sequence in which two or more pairs of pixels that receive light fluxes of object light that has been transmitted through a pair of partial areas in an exit pupil of an image-capturing optical system are arranged along a predetermined direction are sequentially actually exposed, focus adjustment is performed between actual exposures on the basis of a result of focus detection of a phase-difference detection method based on a predetermined signal generated by a focus detection pixel sequence by an actual exposure and a result of focus detection of a phase-difference detection method based on a specific signal generated by a pair of line sensors by another exposure to the sensor unit, which is performed during intervals between actual exposures. As a result, it is possible to perform phase-difference AF during continuous image capturing with high accuracy while suppressing a decrease in a continuous capturing speed.

According to the embodiments of the present invention, in continuous image capturing in which image-capturing elements having a focus detection pixel sequence in which two or more pairs of pixels that receive light fluxes of object light that has been transmitted through a pair of partial areas in an exit pupil of an image-capturing optical system are arranged along a predetermined direction are sequentially actually exposed, focus adjustment is performed between actual exposures on the basis of a result of focus detection of a phase-difference detection method based on a first signal generated by a focus detection pixel sequence by an actual exposure and a result of focus detection of a phase-difference detection method based on a second signal generated by a focus detection pixel sequence by another exposure, which is performed during intervals between actual exposures. As a result, it is possible to perform phase-difference AF during continuous image capturing with high accuracy while suppressing a decrease in a continuous capturing speed.

DESCRIPTION OF THE PREFERRED EMBODIMENTS

First Embodiment

Exterior Configuration of Image-Capturing Apparatus 1A

Figure 1:
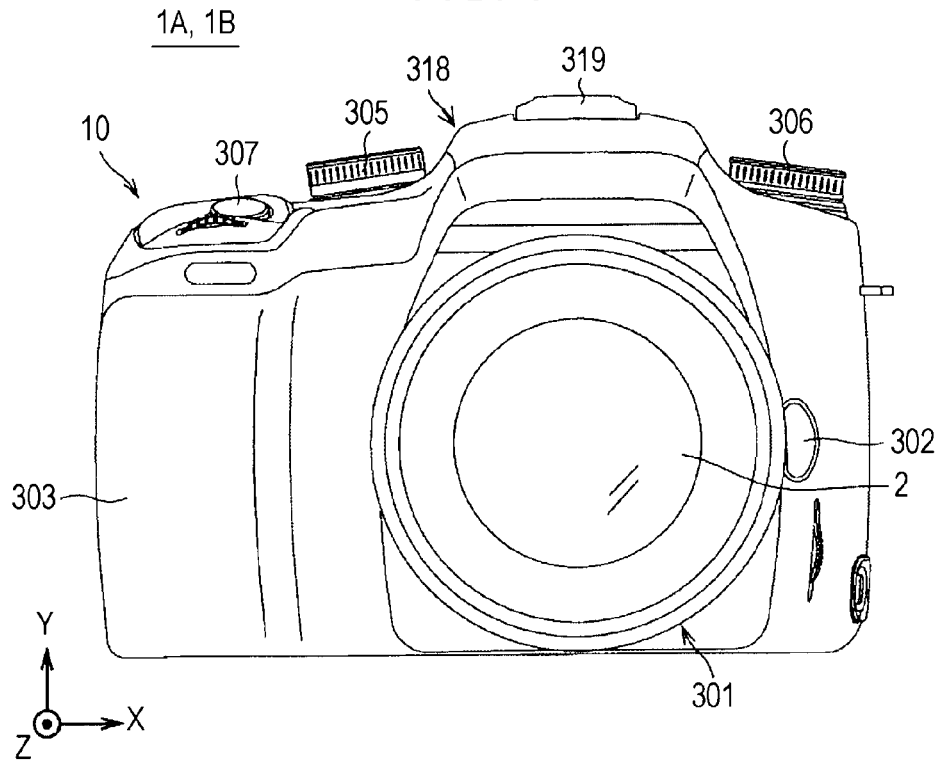
FIG. 1 shows the exterior configuration of an image-capturing apparatus 1A according to a first embodiment of the present invention.
Figure 2:
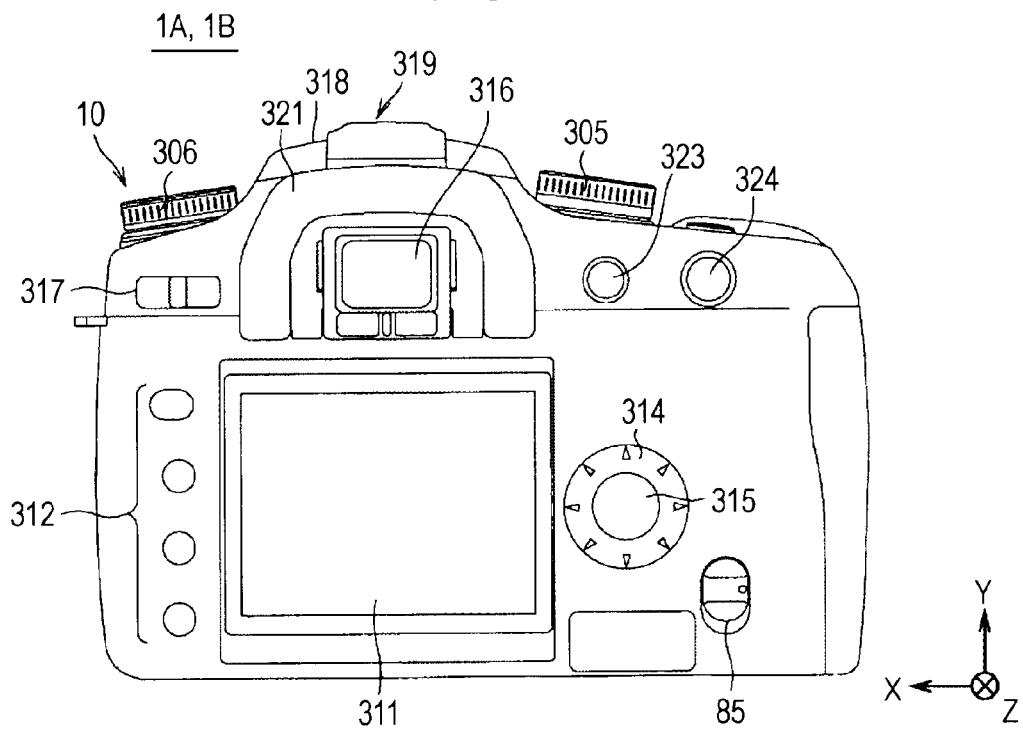
FIG. 2 shows the exterior configuration of the image-capturing apparatus 1A.

FIGS. 1 and 2 show the exterior configuration of an image-capturing apparatus 1A according to a first embodiment of the present invention. Here, FIGS. 1 and 2 show a front view and a back view, respectively.

The image-capturing apparatus 1A is configured as, for example, a single-lens reflex digital still camera, and includes a camera body 10, and an interchangeable lens 2 serving as an image-capturing lens that can be attached to and detached from the camera body 10.

In FIG. 1, provided on the front side of the camera body 10 are a mount unit 301 in which the interchangeable lens 2 is mounted in substantially the center of the front; a lens release button 302 arranged to the right of the mount unit 301; a grip unit 303 with which gripping is possible; a mode setting dial 305 arranged in the upper left area of the front; a control value setting dial 306 arranged in the upper right area of the front; and a shutter button 307 arranged on the top surface of the grip unit 303.

In FIG. 2, provided on the back side of the camera body 10 are a liquid-crystal display (LCD) 311; a setting button group 312 arranged to the left of the LCD 311; a cross key 314 arranged to the right of the LCD 311; a push button 315 arranged in the center of the cross key 314. Furthermore, provided on the back side of the camera body 10 are a finder window 316 disposed above the LCD 311; an eyecup 321 that surrounds the finder window 316; a main switch 317 disposed to the left of the finder window 316; an exposure correction button 323 and an AE lock button 324, which are disposed to the right of the finder window 316; a flash unit 318 disposed above the finder window 316; and a connection terminal unit 319 disposed above the finder window 316.

The mount unit 301 is provided with a connector Ec (see FIG. 5) for making electrical connection with the mounted interchangeable lens 2 and a coupler 75 (see FIG. 5) for making mechanical connection.

The lens exchange button 302 is a button that is pressed when the interchangeable lens 2 mounted in the mount unit 301 is to be demounted.

The grip unit 303 is a part at which a user grips the image-capturing apparatus 1A during image capturing. The grip unit 303 is provided with surface grooves that fit the finger shape for added comfort. A battery compartment and a card compartment (not shown) are provided inside the grip unit 303. The battery compartment is housed with a battery 69B (see FIG. 5) as a power supply for a camera, and the card compartment is housed with a memory card 67 (see FIG. 5) for recording image data of captured images in such a manner that the memory card 67 can be attached thereto and detached therefrom. The grip unit 303 may be provided with a grip sensor for detecting whether the user has gripped the grip unit 303.

The mode setting dial 305 and the control value setting dial 306 are made of members that are substantially disc shaped and that are rotatable within the plane approximately parallel to the top surface of the camera body 10. The mode setting dial 305 is used to selectively select modes and functions installed in the image-capturing apparatus 1A, such as an automatic exposure (AE) control mode, an auto-focus (AF)

control mode, various kinds of image-capturing modes such as a still-image capturing mode for capturing one still image and a moving-image capturing mode, and a reproduction mode in which a captured image is reproduced. On the other hand, the control value setting dial 306 is used to set control values for various kinds of functions installed in the image-capturing apparatus 1A.

The shutter button 307 is a press switch such that an operation of a "half-pressed state" in which the shutter button 307 is pushed in halfway and an operation of a "fully pressed state" in which the shutter button 307 is pushed in further are possible. When the shutter button 307 is half-pressed in the still image-capturing mode, preparatory operations (preparatory operations, such as setting of an exposure control value and focus detection) for capturing a still image of an object are performed. When the shutter button 307 is fully pressed, image capturing operations (a series of operations for exposing the image-capturing element 101 (see FIG. 3), performing predetermined image processing on an image signal obtained by the exposure, and recording the image signal in a memory card or the like) are performed. Here, when the full pressing of the shutter button 307 is continued, a continuous image-capturing mode is reached, and continuous image capturing in which still images are continuously captured is performed.

The LCD 311 includes a color liquid-crystal panel capable of performing image display, so that an image captured using the image-capturing element 101 (see FIG. 3) is displayed and a recorded image is reproduced and displayed and also, a screen for setting functions and modes installed in the image-capturing apparatus 1A is displayed. In place of the LCD 311, an organic EL or plasma display device may be used.

The setting button group 312 includes buttons for performing operations for various kinds of functions installed in the image-capturing apparatus 1A. Examples of the setting button group 312 include a selection set switch for setting content selected on the menu screen displayed on the LCD 311, a selection cancel switch, a menu display switch for switching between content displayed on the menu screen, a display on/off switch, and a display enlargement switch.

The cross key 314 has an annular member including a plurality of press units (triangular marks in the figure) arranged at fixed intervals in the circumferential direction, so that a pressing operation of a press unit is detected using a contact (switch) (not shown) provided in such a manner as to correspond to each press unit. The push button 315 is arranged in the center of the cross key 314. The cross key 314 and the push button 315 are used to input instructions for changing image-capturing magnification (the movement of the zoom lens 212 (see FIG. 5) in the wide direction or in the tele direction), for advancing the frame of a recording image to be reproduced on the LCD 311 or the like, and for setting image capturing conditions (an aperture value, a shutter speed, presence or absence of flash light emission, and the like).

The finder window 316 optically displays a range in which an image of an object is captured. That is, an object image from the interchangeable lens 2 is guided to the finder window 316. By viewing the finder window 316, it is possible for the user to visually recognize an object to be captured in practice by the image-capturing element 101.

The main switch 317 is formed of a two-contact slide switch that slides side by side. When the main switch 317 is set to the left, the power supply of the image-capturing apparatus 1A is switched on, and when the main switch 317 is set to the right, the power supply is switched off.

The flash unit 318 is configured as a pop-up built-in flash. On the other hand, in a case where an external flash or the like is to be mounted in the camera body 10, connection is made using the connection terminal unit 319.

The eyecup 321, which has light-transmitting properties, is a U-shaped light-shielding member, which suppresses intrusion of extraneous light to the optical finder 316.

The exposure correction button 323 is a button for manually adjusting exposure values (an aperture value and a shutter speed). The AE lock button 324 is a button for fixing exposure.

The interchangeable lens 2 functions as a lens window for receiving light (optical image) from an object and also functions as an image-capturing optical system for guiding object light to an image-capturing element 101 arranged inside the camera body 10. The interchangeable lens 2 can be detached from the camera body 10 by pressing the lens release button 302.

Figure 5:
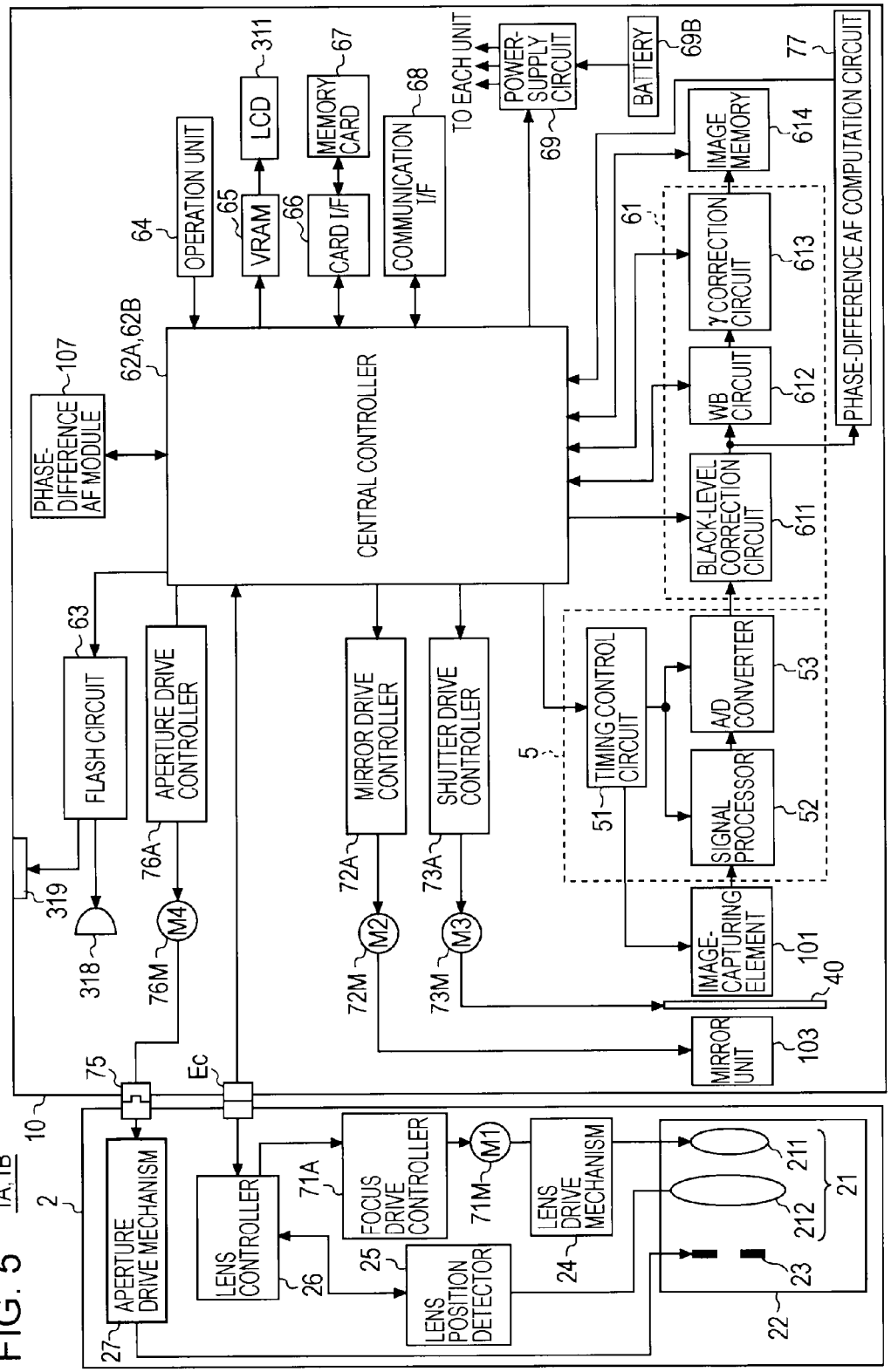
FIG. 5 is a block diagram showing the electrical configuration of the image-capturing apparatus 1A.

The interchangeable lens 2 includes a lens group 21 formed of a plurality of lenses arranged in a serial manner along an optical axis LT (see FIG. 5). The lens group 21 includes a focus lens 211 (see FIG. 5) for adjusting focus and a zoom lens 212 (see FIG. 5) for performing variable power. As a result of the lenses being driven in the direction of the optical axis LT (see FIG. 3), focus adjustment and variable power are performed, respectively. Furthermore, the interchangeable lens 2 is provided with an operation ring that is rotatable along the outer peripheral surface of a lens barrel at an appropriate outer peripheral place. The zoom lens 212 is moved in an optical-axis direction in accordance with the rotational direction and the number of revolutions of the operation ring by manual operation or by automatic operation so that the zoom lens 212 is set at a zoom magnification (image-capturing magnification) corresponding to the position of a movement destination.

Internal Configuration of Image-Capturing Apparatus 1A

Figure 3:
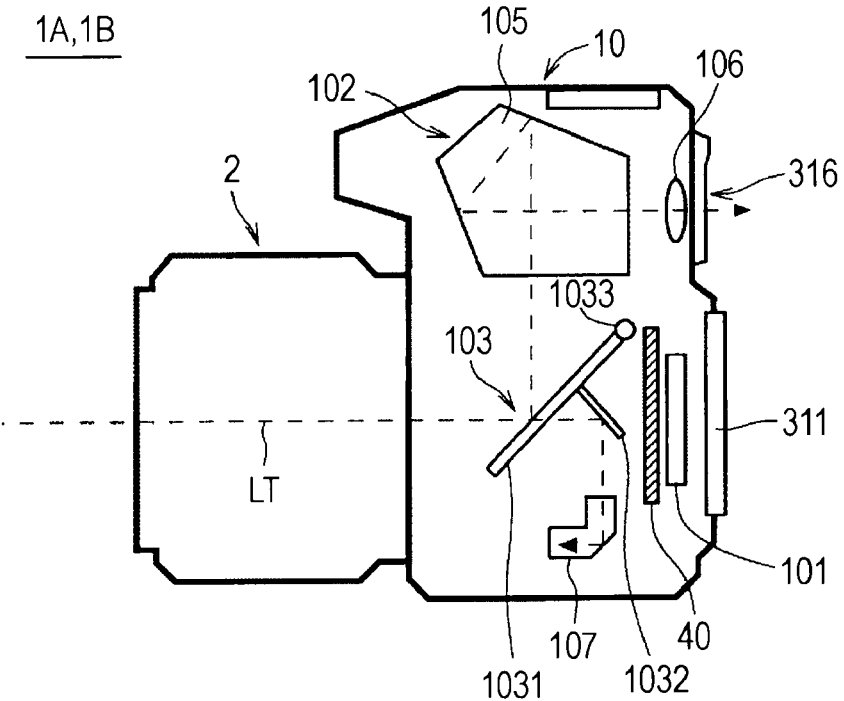
FIG. 3 is a longitudinal sectional view of the image-capturing apparatus 1A.

Next, the internal configuration of the image-capturing apparatus 1A will be described. FIG. 3 is a longitudinal sectional view of the image-capturing apparatus 1A. As shown in FIG. 3, an image-capturing element 101, a finder unit 102 (finder optical system), a mirror unit 103, a phase-difference AF module 107, and the like are provided inside the camera body 10.

The image-capturing element 101 is arranged perpendicularly to the optical axis LT along the optical axis LT of the lens group provided in the interchangeable lens 2 in a case where the interchangeable lens 2 is mounted in the camera body 10. For the image-capturing element 101, for example, a CMOS color-area sensor (CMOS image-capturing element) in which a plurality of pixels each having a photodiode are arranged in matrix in a two dimensional manner is used. The image-capturing element 101 generates an analog electrical signal (image signal) of components of each color of R (red), G (green), and B (blue), which are related to an object optical image that is formed as an image after passing through the interchangeable lens 2, and outputs the analog electrical signal as an image signal of each color of R, G, and B. The configuration of the image-capturing element 101 will be described in detail later.

In the optical axis LT, the mirror unit 103 is arranged at a position at which object light is reflected toward the finder unit 102. The object light that has been transmitted through the interchangeable lens 2 is reflected upward by the mirror unit 103 (a main mirror 1031 (to be described later)) and also, some of the object light that has been transmitted through the interchangeable lens 2 is transmitted through the mirror unit 103.

The finder unit 102 includes a pentaprism 105, an eyepiece lens 106, and an optical finder 316. The pentaprism 105 is a prism that has a pentagonal shape in cross section, by which the top and bottom and the left and right of an object optical image formed by light entering the lower surface of the prism are flipped by the reflection in the inside and formed as an erect image. The eyepiece lens 106 guides the light of the object optical image formed as an erect image by the pentaprism 105 to the outside of the finder window 316. With such a configuration, the finder unit 102 functions as a finder for confirming an object field at image-capturing waiting time before actual image capturing.

The mirror unit 103 includes the main mirror 1031 and a sub-mirror 1032. On the back side of the main mirror 1031, the sub-mirror 1032 is rotatably provided in such a manner as to fall toward the back side of the main mirror 1031. Some of the object light that has been transmitted through the main mirror 1031 is reflected by the sub-mirror 1032, and the reflected object light enters the phase-difference AF module 107.

Figure 4:
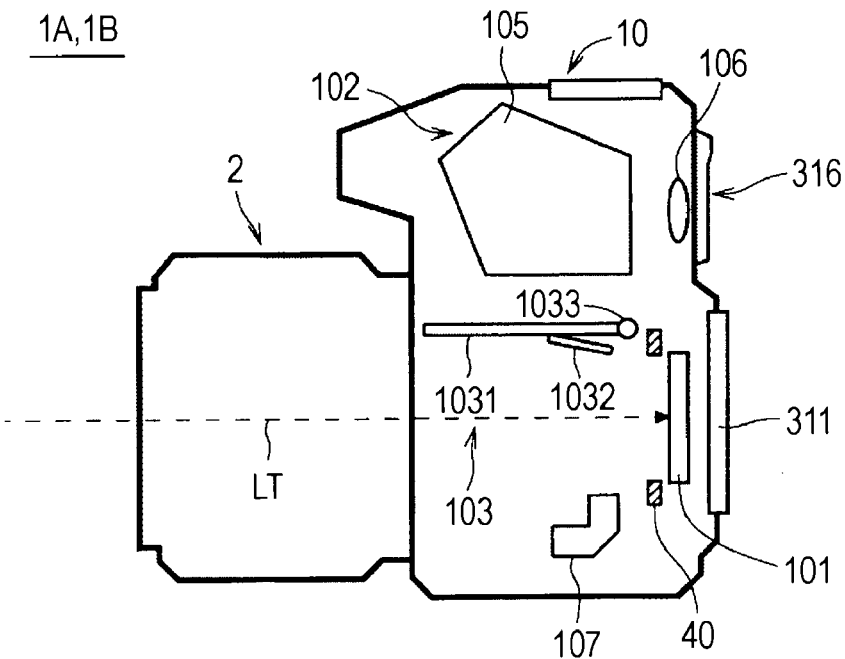
FIG. 4 shows a mirror-up state in a mirror unit 103.

The mirror unit 103 is configured as a so-called quick return mirror and is a part for switching between a light path (first light path) for guiding object light that has been transmitted through the interchangeable lens 2 to the phase-difference AF module 107, as shown in FIG. 3, and a light path (second light path) for guiding object light that has been transmitted through the interchangeable lens 2 to the image-capturing element 101, as shown in FIG. 4. More specifically, during exposure time (during actual image capturing), as shown in FIG. 4, the mirror unit 103 jumps upward by using a rotational axis 1033 as a fulcrum. At this time, when the mirror unit 103 is stopped at a position below the pentaprism 105, the sub-mirror 1032 becomes folded so as to be substantially parallel to the main mirror 1031. As a result, the object light from the interchangeable lens 2 reaches the image-capturing element 101 without being shielded by the mirror unit 103, and the image-capturing element 101 is exposed. When the image-capturing operation in the image-capturing element 101 is completed, the mirror unit 103 returns to the original position (the position shown in FIG. 3), and the object light that has been transmitted through the interchangeable lens 2 is guided to the phase-difference AF module 107.

Furthermore, by causing the mirror unit 103 to reach a mirror-up state shown in FIG. 4 before actual image capturing (image capturing for image recording purpose), it becomes possible for the image-capturing apparatus 1A to perform a live-view (preview) display in which an object is displayed on the LCD 311 in a movie-like mode on the basis of image signals generated in sequence by the image-capturing element 101. That is, in the image-capturing apparatus 1A before actual image capturing, it is possible to select an electronic finder (live-view mode) in which the above-described live-view display is performed, or the optical finder, and determine the composition of the object. The switching between the electronic finder and the optical finder is performed by operating the selector switch 85 shown in FIG. 2.

The phase-difference AF module 107 is configured as a so-called AF sensor formed of a range-finding element for detecting focusing information on an object. The phase-difference AF module 107 is disposed in the bottom part of the mirror unit 103 and detects a focus position by focal point detection (hereinafter also referred to as "phase-difference AF") of a phase-difference detection method. That is, in a case where the object is to be confirmed by the user by using the finder window 316 during image-capturing waiting time, as shown in FIG. 3, the object light is guided to the phase-difference AF module 107 in a state in which the main mirror 1031 and the sub-mirror 1032 are tilted down and also, the focus lens 211 inside the interchangeable lens 2 is driven on the basis of the output from the phase-difference AF module 107 so that focusing is achieved.

On the front side in the optical-axis direction of the image-capturing element 101, a shutter unit 40 is arranged. The shutter unit 40 includes a curtain that moves in the up-and-down direction, and is configured as a mechanical focal plane shutter for performing a light-path opening operation and a light-path shielding operation for object light that is guided to the image-capturing element 101 along the optical axis LT as a result of the opening operation and the closing operation thereof. The shutter unit 40 can be omitted in a case where the image-capturing element 101 is a completely electronic shutter capable image-capturing element.

Electrical Configuration of Image-Capturing Apparatus 1A

FIG. 5 is a block diagram showing the electrical configuration of the image-capturing apparatus 1A. Here, members identical to those in FIGS. 1 to 4 are designated with the same reference numerals. For the sake of description, the electrical configuration of the interchangeable lens 2 will be described first.

The interchangeable lens 2 includes, in addition to the above-described lens group 21, a lens drive mechanism 24, a lens position detector 25, a lens controller 26, and an aperture drive mechanism 27.

In the lens group 21, the focus lens 211, the zoom lens 212, and the aperture 23 for adjusting the amount of light that enters the image-capturing element 101 provided in the camera body 10 are held in the direction of the optical axis LT (FIG. 3) within the lens barrel, so that an optical image of the object is received and formed as an image in the image-capturing element 101. In AF control, focus adjustment is performed by the focus lens 211 being driven in the direction of the optical axis LT by an AF actuator 71M inside the interchangeable lens 2.

On the basis of the AF control signal supplied from the central controller 62A via the lens controller 26, the focus drive controller 71A generates a driving control signal for the AF actuator 71M, which is necessary to move the focus lens 211 to the focus position. The AF actuator 71M is formed of a stepping motor and the like, and supplies a lens driving force to the lens drive mechanism 24.

The lens drive mechanism 24 is formed of, for example, a helicoid and gears (not shown) with which the helicoid is rotated. By receiving a driving force from the AF actuator 71M, the lens drive mechanism 24 causes the focus lens 211 and the like to be driven in a direction parallel to the optical axis LT. The movement direction and the amount of movement of the focus lens 211 accord with the rotational direction and the number of revolutions of the AF actuator 71M, respectively.

The lens position detector 25 includes an encoding plate on which a plurality of code patterns are formed at predetermined pitches in the direction of the optical axis LT within the range of the movement of the lens group 21, and an encoder brush that moves integrally with a lens while slidably contacting the encoding plate, and detects the amount of movement when the focus of the lens group 21 is to be adjusted. The lens position detected by the lens position detector 24 is output as, for example, the number of pulses.

The lens controller 26 is constituted by a microcomputer in which, for example, a ROM storing control programs and a memory such as a flash memory storing data on status information are incorporated.

The lens controller 26 has a communication function of performing communication with the central controller 62A of the camera body 10 via the connector Ec. As a result, for example, status information data, such as the focus distance, the aperture value, the in-focus distance, and the peripheral light amount status of the lens group 21, and the position information on the focus lens 211, which is detected by the lens position detector 25, can be transmitted to the central controller 62. Also, for example, data on the amount of driving of the focus lens 211 can be received from the central controller 62A.

Upon receiving the driving force from the aperture driving actuator 76M via the coupler 75, the aperture drive mechanism 27 changes the aperture diameter of the aperture 23.

Next, the electrical configuration of the camera body 10 will be described. The camera body 10 includes, in addition to the above-described image-capturing element 101, the shutter unit 40 and the like, an analog front end (AFE) 5, an image processor 61, an image memory 614, a central controller 62A, a flash circuit 63, an operation unit 64, a VRAM 65, a card I/F 66, a memory card 67, a communication I/F 68, a power-supply circuit 69, a battery 69B, a mirror driving controller 72A, a mirror driving actuator 72M, a shutter driving controller 73A, an aperture driving controller 76A, and an aperture driving actuator 76M.

The image-capturing element 101 is formed of a CMOS color-area sensor, as described earlier. A timing control circuit 51 (to be described later) controls image-capturing operations, such as the start (and the completion) of the exposure operation of the image-capturing element 101, selection of the output of each pixel provided in the image-capturing element 101, and the reading of a pixel signal.

The AFE 5 supplies, to the image-capturing element 101, a timing pulse at which a predetermined operation is performed, performs predetermined signal processing on an image signal output from the image-capturing element 101 so that the image signal is converted into a digital signal, and outputs the digital signal to the image processor 61. The AFE 5 is configured to have a timing control circuit 51, a signal processor 52, an A/D converter 53, and the like.

The timing control circuit 51 generates predetermined timing pulses (pulses for generating a vertical scanning pulse φVn, a horizontal scanning pulse φVm, a reset signal φVr, and the like) on the basis of a reference clock output from the central controller 62A, and outputs the timing signal to the image-capturing element 101, thereby controlling the image-capturing operation of the image-capturing element 101. By outputting predetermined timing pulses to the signal processor 52 and the A/D converter 53, respectively, the operations of the signal processor 52 and the A/D converter 53 are controlled.

The signal processor 52 performs predetermined analog signal processing on an analog image signal output from the image-capturing element 101. The signal processor 52 includes a correlated double sampling (CDS) circuit, an automatic gain control (AGC) circuit, a clamp circuit, and the like. On the basis of a timing pulse output from the timing control circuit 51, the A/D converter 53 converts analog image signals of R, G, and B, which are output from the signal processor 52, into digital image signals made up of a plurality of bits (for example, 12 bits).

The image processor 61 creates an image file by performing predetermined signal processing on image data output from the AFE 5. The image processor 61 is configured to have a black-level correction circuit 611, a white-balance control circuit 612, a gamma correction circuit 613, and the like. The image data received by the image processor 61 is once written in an image memory 614 in synchronization with the reading of the image-capturing element 101. Hereinafter, access is made to the image data written in the image memory 614, and processing is performed in each block of the image processor 61.

The black-level correction circuit 611 corrects the black level of each digital image signal of R, G, and B, which is A/D-converted by the A/D converter 53, into a reference black level.

On the basis of the reference for white in accordance with the light source, the white-balance correction circuit 612 performs level conversion (white-balance (WB) adjustment) of a digital signal of components of each color of R (red), G (green), and B (blue). That is, on the basis of the WB adjustment data supplied from the central controller 62, the white-balance control circuit 612 specifies, from luminance data, color saturation data, and the like, a portion that is estimated to be originally white color in an image-capturing object, determines the average of the components of each of R, G, and B of that portion, a G/R ratio, and a G/B ratio, and performs level correction by using these ratios as correction gains of R and B.

The gamma correction circuit 613 corrects gradation characteristics of WB-adjusted image data. More specifically, by using a preset gamma correction table, the gamma correction circuit 613 performs, for each color component, non-linear conversion of the level of the image data, and offset adjustment.

The image memory 614 is a memory used as a work area in which, during the image-capturing mode, image data output from the image processor 61 is temporarily stored and also, a predetermined process is performed on the image data by the central controller 62A. Furthermore, during the reproduction mode, image data read from the memory card 67 is temporarily stored.

The central controller 62A is constituted by a microcomputer in which, for example, a ROM for storing control programs and a storage unit, such as a PAM, for temporarily storing data are incorporated, and controls the operation of each unit of the image-capturing apparatus 1A.

The flash circuit 63 controls the amount of light emission of the flash unit 318 or an external flash connected to the connection terminal unit 319 so as to be set to the amount of light emission set by the central controller 62A.

The operation unit 64 includes the mode setting dial 305, the control value setting dial 306, the shutter button 307, the setting button group 312, the cross key 314, the push button 315, the main switch 317, etc., and is used to input operation information to the central controller 62A.

The VRAM 65 is a buffer memory between the central controller 62A and the LCD 311, which has a storage capacity of image signals corresponding to the number of pixels of the LCD 311. The card I/F 66 is an interface for enabling transmission and reception of signals between the memory card 67 and the central controller 62A. The memory card 67 is a recording medium for storing image data generated by the central controller 62A. The communication I/F 68 is an interface for enabling transmission of image data and the like to a personal computer or another external device.

The power-supply circuit 69 is formed of, for example, a constant voltage circuit and the like, and generates a voltage for driving the entire image-capturing apparatus 1A, such as the controller (such as the central controller 62A), the image-capturing element 101, and other various kinds of driving units. Control of electricity supply to the image-capturing element 101 is performed in accordance with a control signal supplied from the central controller 62 to the power-supply circuit 69. The battery 69B is a power supply that is formed of a primary battery such as an alkali dry battery or a secondary battery such as a nickel-metal-hydride rechargeable battery, and that supplies electric power to the entire image-capturing apparatus 1A.

The mirror driving controller 72A generates a driving signal for driving the mirror driving actuator 72M in accordance with the timing of the image capturing operation. The mirror driving actuator 72M is an actuator that causes the mirror unit 103 (quick return mirror) to be rotated in a horizontal posture or in an inclined posture.

The shutter driving controller 73A generates a driving control signal for the shutter driving actuator 73M on the basis of the control signal supplied from the central controller 62A. The shutter driving actuator 73M is an actuator for performing opening/closing driving (opening/closing operation) of the shutter unit 40.

The aperture driving controller 76A generates a driving control signal for the aperture driving actuator 76M on the basis of the control signal supplied from the central controller 62A. The aperture driving actuator 76M supplies a driving force to the aperture drive mechanism 27 via the coupler 75.

The camera body 10 includes a phase-difference AF computation circuit 77 for performing computations necessary at the time of auto-focus (AF) control using the image-capturing element 101 on the basis of image data whose black level has been corrected, which is output from the black-level correction circuit 611.

In the following, a description will be given of a phase-difference AF operation of the image-capturing apparatus 1A using the phase-difference AF computation circuit 77.

Phase-Difference AF Operation of Image-Capturing Apparatus 1A

The image-capturing apparatus 1A is configured in such a manner that phase-difference AF is possible by receiving light that has been transmitted through (passed through) different portions of the exit pupil in the image-capturing element 101. A description will be given below of the configuration of the image-capturing element 101 and the principles of phase-difference AF using the image-capturing element 101.

Figure 6:
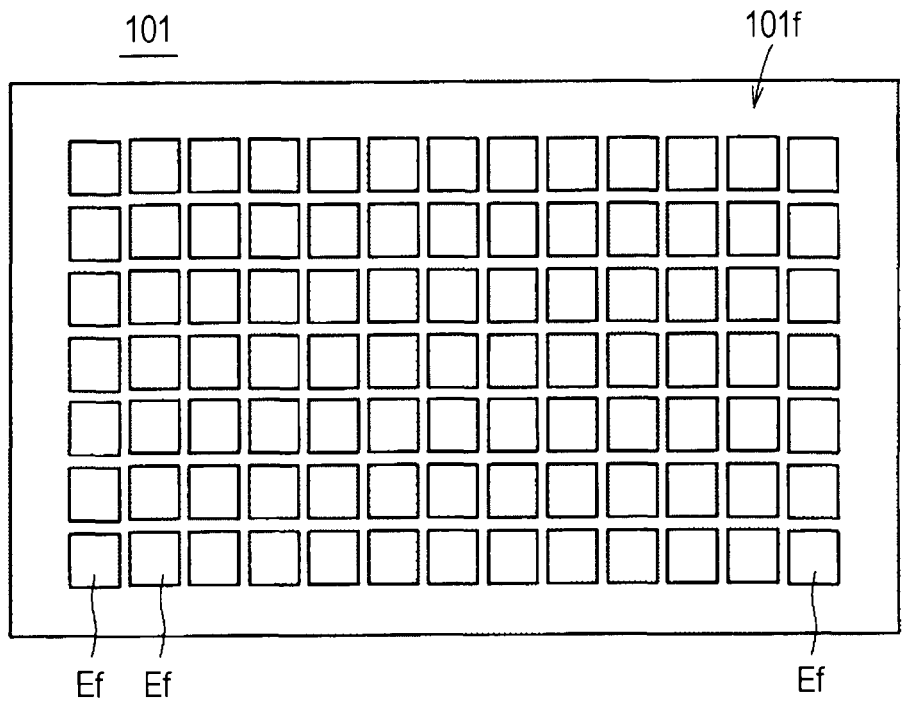
FIG. 6 illustrates the configuration of an image-capturing element 101.
Figure 7:
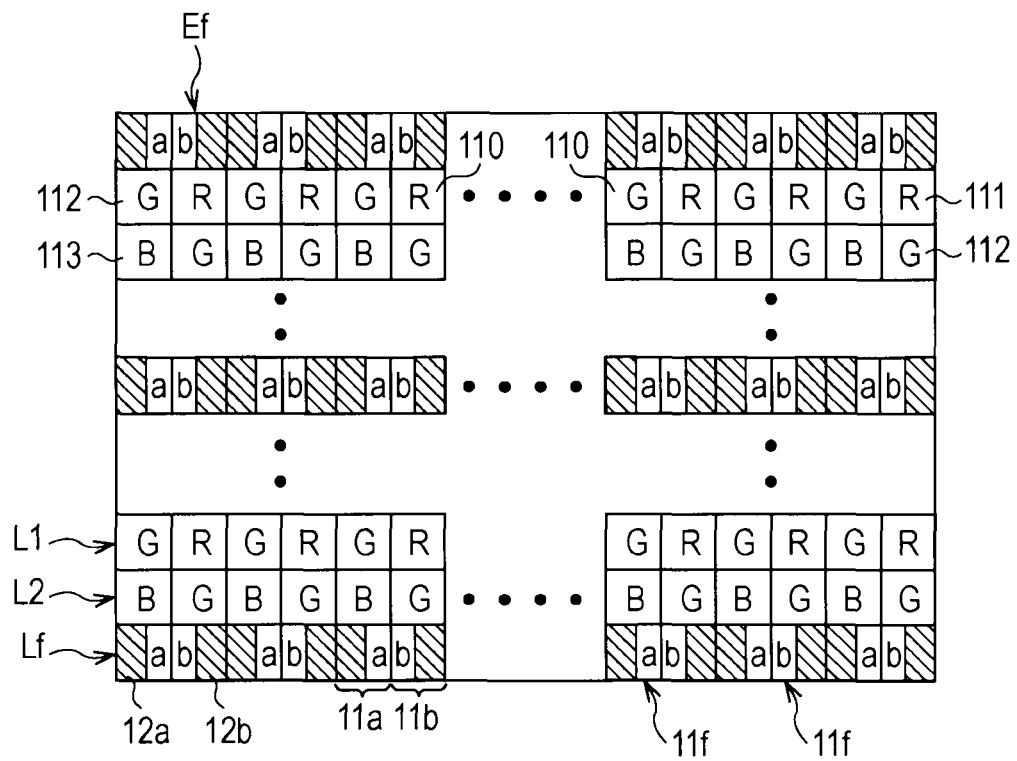
FIG. 7 illustrates the configuration of the image-capturing element 101.

FIGS. 6 and 7 illustrate the configuration of the image-capturing element 101.

The image-capturing element 101 is configured in such a manner that focus detection of a phase-difference detection method is possible for each of a plurality of AF areas Ef defined in matrix in an image-capturing plane 101f thereof (FIG. 6).

In each AF area Ef, ordinary pixels 110 formed of an R pixel 111, a G pixel 112, and a B pixel 113 in which color filters of each of R (red), G (green), and B (blue) are disposed in a photodiode are provided and also, a pixel (hereinafter also referred to as an "AF pixel") 11f for performing phase-difference AF, which has light-shielding plates 12a and 12b (parallel oblique line area) (to be described later) is provided (FIG. 7).

Then, in the AF area Ef, as a horizontal line of ordinary pixels 110, a Gr line L1 in which a G pixel 112 and an R pixel 111 are alternately arranged in the horizontal direction, and a Gb line L2 in which a B pixel 113 and a G pixel 112 are alternately arranged in the horizontal direction, are formed. As a result of the Gr line L1 and the Gb line L2 being alternately arranged in the vertical direction, pixels in Bayer arrangement are formed, so that an image signal related to an object optical image that has been transmitted through the interchangeable lens 2 can be generated.

Furthermore, in the AF area Ef, for example, an AF line (focus detection pixel sequence) Lf in which AF pixels 11f are arranged in the horizontal direction every six horizontal lines of the ordinary pixels 110 is formed. In the AF area Ef, for example, approximately 20 AF lines Lf are provided.

Next, the principles of phase-difference AF using an AF line Lf will be described in detail.

Figure 8:
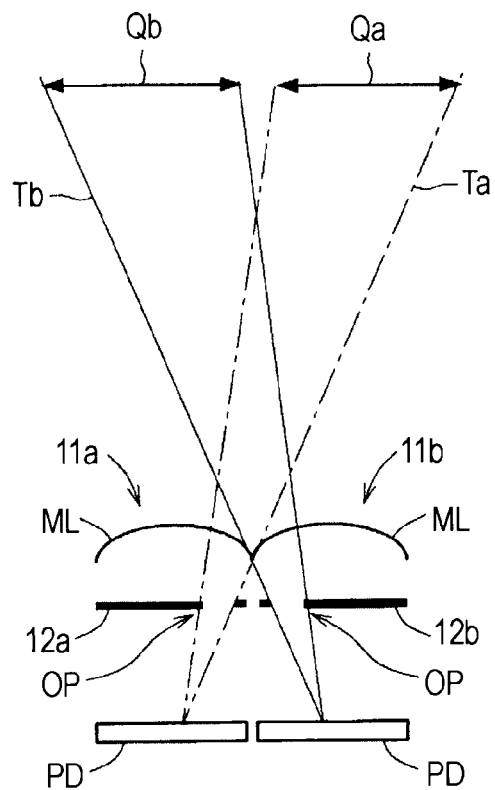
FIG. 8 illustrates the principles of phase-difference AF using an AF line Lf.

FIG. 8 illustrates the principles of phase-difference AF using an AF line Lf.

In the AF line Lf, two or more pairs of pixels 11a and 11b having light-shielding plates 12a and 12b, in which openings OP that separate a light flux Ta from the right-side portion Qa of the exit pupil and a light flux Tb from the left-side portion Qb thereof with regard to the interchangeable lens 2 are in mirror symmetry, are arranged in the horizontal direction. In more detail, a pixel (also referred to as a "first AF pixel") 11a having a light-shielding plate (hereinafter also referred to as a "first AF pixel") 11a in which an opening OP in a slit shape is offset to the right of a photoelectric converter (photodiode) PD just below, and a pixel (also referred to as a "second AF pixel") 11a having a light-shielding plate (hereinafter also referred to as a "second AF pixel") 11b in which an opening OP in a slit shape is offset to the left of a photoelectric converter (photodiode) PD just below are alternately arranged in the AF pixel 11. As a result, the light flux Ta from the right-side portion Qa of the exit pupil passes through the microlens ML and the opening OP of the light-shielding plate 12a, is received by the photoelectric converter PD of the first AF pixel 11a. The light flux Tb from the left-side portion Qb of the exit pupil passes through the microlens ML and the opening OP of the light-shielding plate 12b and is received by the photoelectric converter PD of the second AF pixel 11b. In other words, in the pair of pixels 11a and 11b, the light fluxes Ta and Tb of the object light that has been transmitted through the right-side portion Qa and the left-side portion Qb (pair of partial areas) in the exit pupil of the interchangeable lens 2 are received, respectively.

In the following, the pixel output of the first AF pixel 11a will be referred to as "pixel output of sequence a", and the pixel output of the second AF pixel 11b will be referred to as "pixel output of sequence b". For example, the relationship between the pixel output of sequence a and the pixel output of sequence b, which are obtained from the pixel arrangement of the AF pixels 11f arranged in one certain AF line Lf, will be described with reference to FIGS. 9 and 10.

Figure 9:
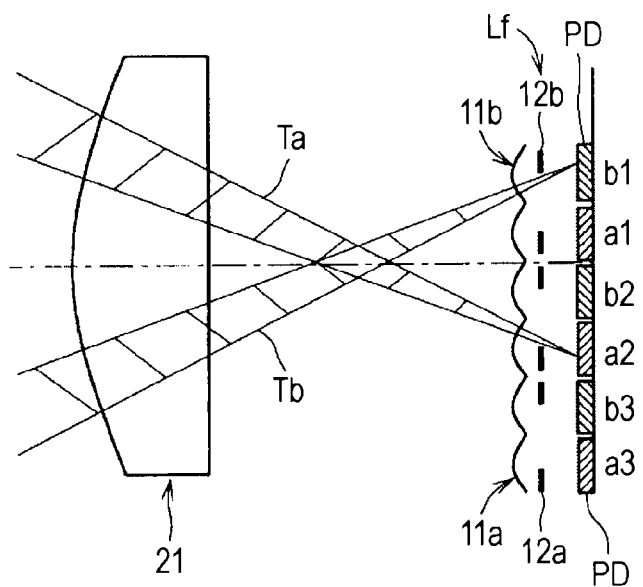
FIG. 9 illustrates the relationship between pixel output of sequence a and pixel output of sequence b.

In the AF line Lf, for example, as shown in FIG. 9, the light fluxes Ta and Tb from both sides of the exit pupil are received by the first AF pixel 11a and the second AF pixel 11b, respectively. Here, the pixel output of sequence a in the AF line Lf including pixels a1 to a3 of sequence a arranged as shown in FIG. 9 is expressed as a graph Ga (shown using the solid line) in FIG. 10. On the other hand, the pixel output of sequence b in the AF line Lf including pixels b1 to b3 of sequence b arranged as shown in FIG. 9 is expressed as a graph Gb (shown using the dashed line). That is, the pixel output of sequence a and the pixel output of sequence b enables a pair of image sequences Ga and Gb represented by the graphs Ga and Gb to be generated.

Figure 10:
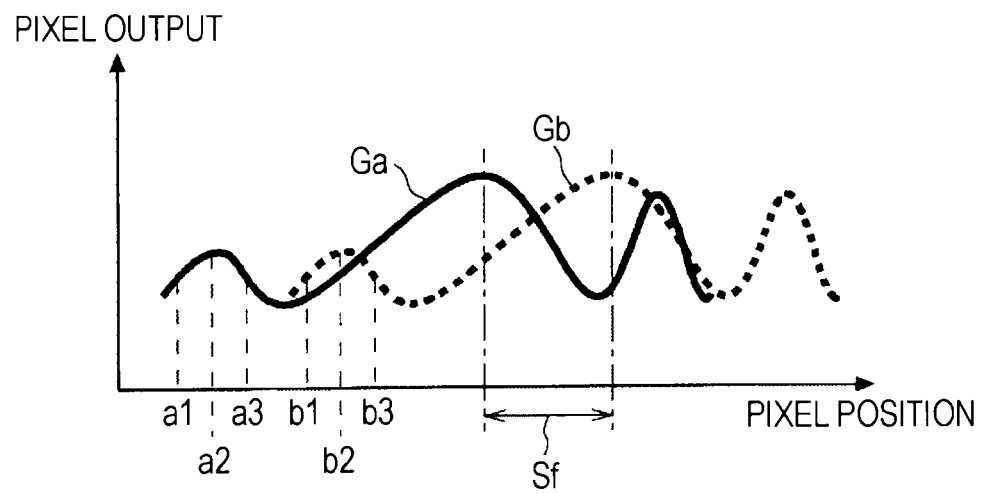
FIG. 10 illustrates the relationship between pixel output of sequence a and pixel output of sequence b.

When the graph Ga and the graph Gb shown in FIG. 10 are compared with each other, it can be seen that, for the pixel output of sequence a and the pixel output of sequence b, a phase difference has occurred in an offset amount (shift amount) Sf in the direction of the AF line Lf (in the horizontal direction) of the AF line Lf.

Figure 11:
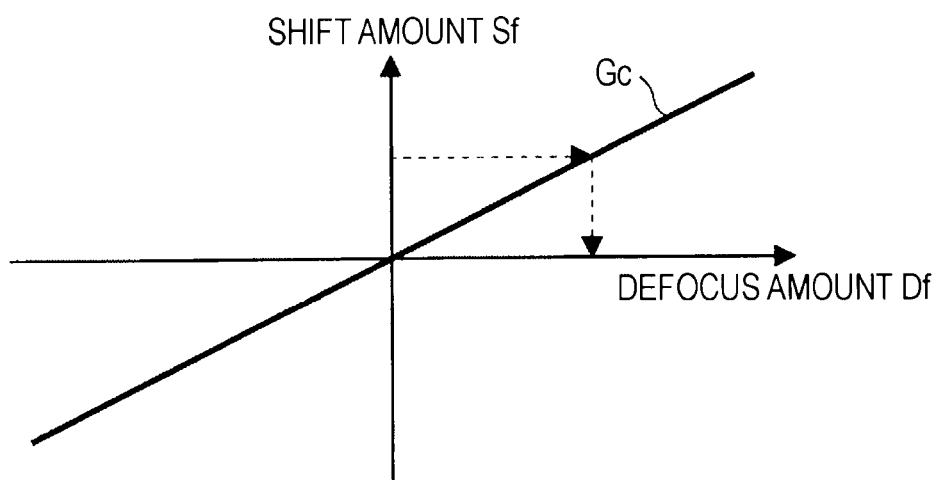
FIG. 11 shows the relationship between a shift amount Sf and a defocus amount.

On the other hand, the relationship between the above-described shift amount Sf and the amount (the defocus amount) that the focal plane is defocused to the image-capturing plane of the image-capturing element 101 is represented by a graph Gc of a primary function shown in FIG. 11. The inclination of the graph Gc can be obtained in advance by a factory test and the like.

Therefore, after the shift amount Sf is determined by the phase-difference AF computation circuit 77 on the basis of the output from the AF line Lf of the image-capturing element 101, the defocus amount Df is computed on the basis of the graph Gc of FIG. 11, and the driving amount corresponding to the computed defocus amount is supplied to the focus lens 211, making possible phase-difference AF that causes the focus lens 211 to be moved to the focus position.

Also, in phase-difference AF using the phase-difference AF module 107, operations similar to those of the above-described phase-difference AF using the image capturing element 101 are performed. That is, the phase-difference AF module 107 includes a pair of line sensors that receive a light flux of object light that has been transmitted through the right-side portion Qa of the exit pupil and a light flux of object light that has been transmitted through the left-side portion Qb thereof, respectively, with regard to the interchangeable lens 2. Phase-difference AF is performed on the basis of the output signal from the phase-difference AF module (sensor unit) 107.

A description will be given below of an AF operation during continuous image capturing in the image-capturing apparatus 1A in which phase-difference AF is possible using the image-capturing element (the image-capturing element with a phase-difference detection function) 101 described above.

AF Operation During Continuous Image Capturing

Figure 12:
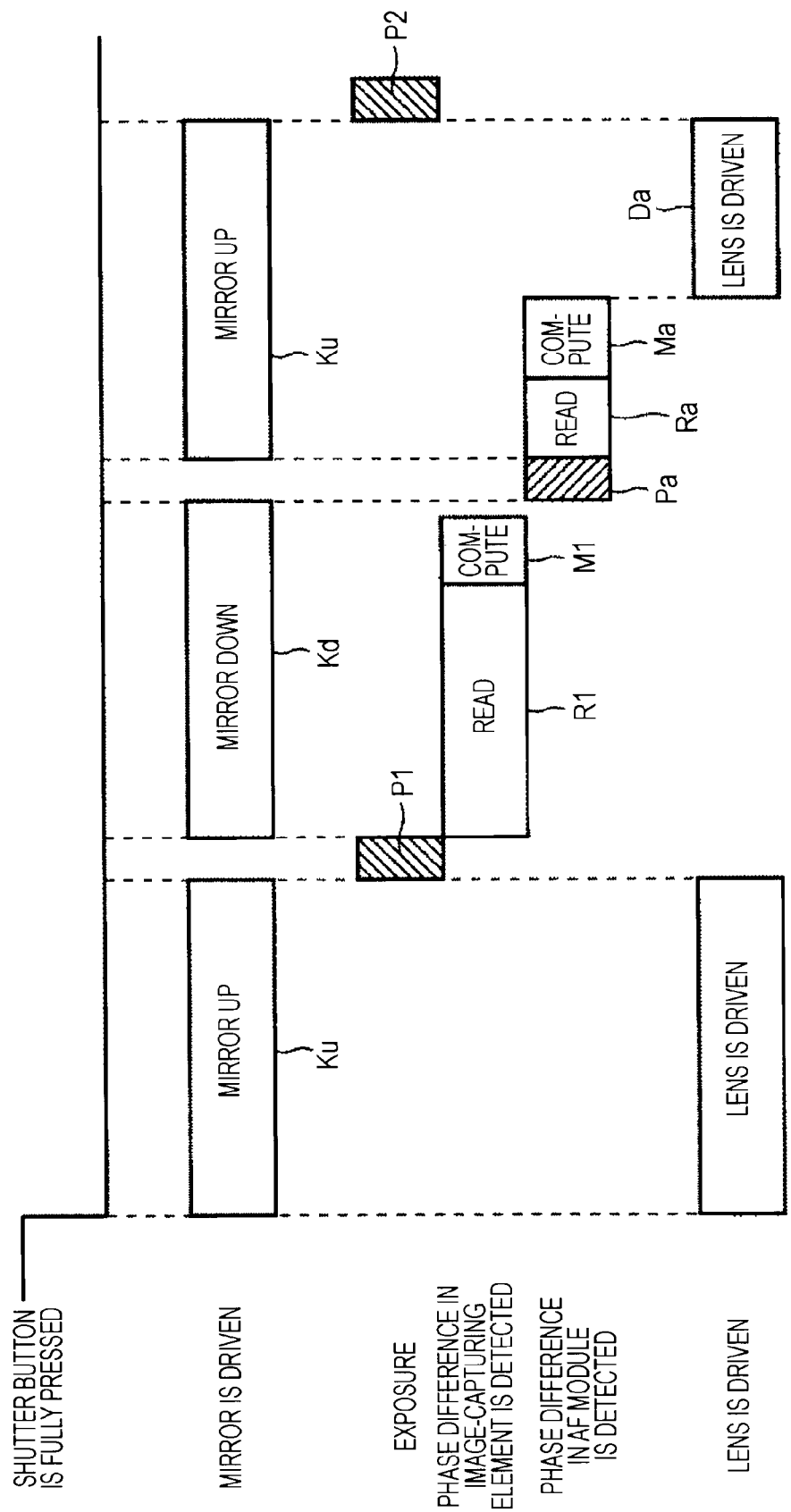
FIG. 12 is a timing chart illustrating an AF operation at the time of continuous image capturing in the image-capturing apparatus 1A.

FIG. 12 is a timing chart illustrating AF operations during continuous image capturing in the image-capturing apparatus 1A.

In the image-capturing apparatus 1A, when the full pressing of the shutter button 307 is continued in the manner described above, continuous image capturing in which the image-capturing elements 101 are sequentially exposed (actually exposed). During the continuous image capturing, phase-difference AF based on exposure data of the image-capturing element 101 is made possible. The AF operation during the continuous capturing will be described in detail below.

When the shutter button 307 is fully pressed, first, the up driving Ku of the mirror unit 103 is performed. Thereafter, a first actual exposure P1 is performed in the image-capturing element 101 that has received object light from the interchangeable lens 2.

Next, the down driving Ku of the mirror unit 103 is started to guide light to the phase-difference AF module 107 and also, reading (reading of all the pixels) R1 of a charge signal (exposure data) generated by all the pixels (effective pixels) of the image-capturing element 101 by the actual exposure P1 is performed. A computation process M1 of phase-difference AF based on the pixel data of the AF line Lf contained in the exposure data read by the reading of all the pixels R1 is performed by the phase-difference AF computation circuit 77, and the defocus amount is determined.

On the other hand, when the down driving Kd of the mirror unit 103 is completed, after the exposure Pa of the phase-difference AF module 107 is performed, reading Ra of a charge signal (exposure data) generated by the line sensor of the phase-difference AF module 107 is performed. A computation process Ma of phase-difference AF based on exposure data read by the reading Ra is performed by the central controller 62A, and the defocus amount is determined.

Then, lens driving Da for driving the focus lens 211 to the in-focus position is performed on the basis of the defocus amount (hereinafter also referred to as a "first defocus amount") determined by the computation process M1 and the defocus amount (hereinafter also referred to as a "second defocus amount") determined by the computation process Ma.

In more detail, when the object is a stationary body, lens driving Da based on a defocus amount such that the first defocus amount and the second defocus amount are averaged is performed. On the other hand, when the object is a moving body (mobile body) having a dynamic distance change with the image-capturing apparatus 1A, lens driving Da in which the motion of the object is prefetched on the basis of the first defocus amount and the second defocus amount obtained at different timings and the focus lens 211 is moved to the focus position at the time of the second actual exposure P2, which is derived by performing moving body prediction of predicting the focus position (in-focus position). A determination as to whether the object is a stationary body or a moving body is made by detecting whether or not, in the AF operation performed before the shutter button 307 is fully pressed, the focus position has varied, for example, in consequence of a change in the distance between the image-capturing apparatus 1A and the object.

As a result of the above-described lens driving Da, an actual exposure P2 regarding second image capturing is performed in a satisfactory focused state. Also, when third and subsequent image capturing are to be performed, as a result of an operation similar to lens driving Da based on the first and second defocus amounts described above being performed during intervals between actual exposures, focus adjustment by phase-difference AF with high accuracy is performed.

As described above, first phase-difference detection based on the exposure data of the AF line Lf of the image-capturing element 101, which is generated by the actual exposure, and second phase-difference detection by the phase-difference AF module 107 are performed between the actual exposures P1 and P2 during continuous image capturing. Therefore, the accuracy of the phase-difference AF can be improved. Then, as shown in FIG. 12, if the first phase-difference detection is performed during the down driving of the mirror unit 103, high-accuracy phase-difference AF is made possible without decreasing the continuous capturing speed.

In the following, the basic operation of the image-capturing apparatus 1A that perform the above-described AF operation during continuous image capturing will be described.

Basic Operation of Image-Capturing Apparatus 1A

Figure 13:
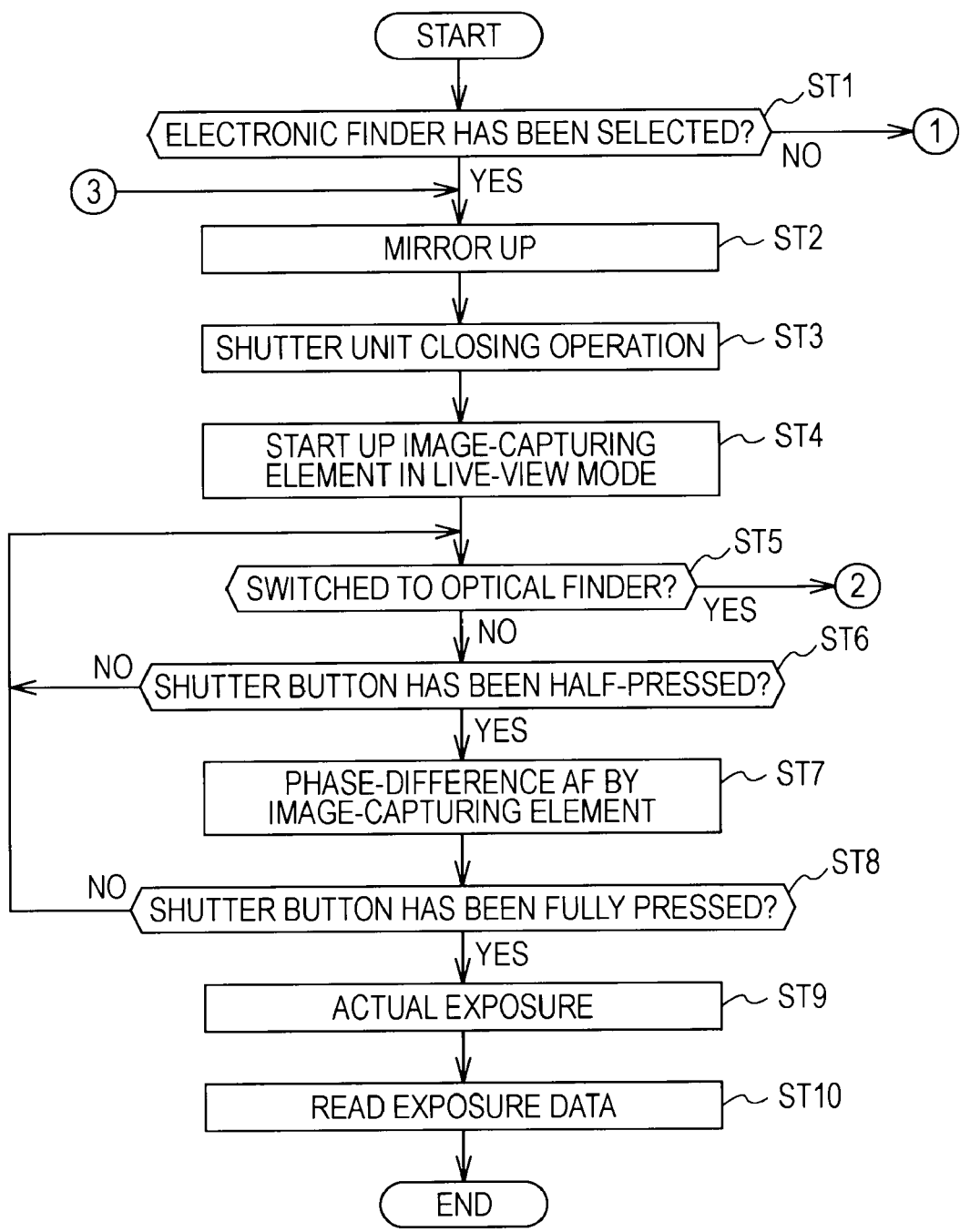
FIG. 13 is a flowchart showing the basic operation of the image-capturing apparatus 1A.
Figure 14:
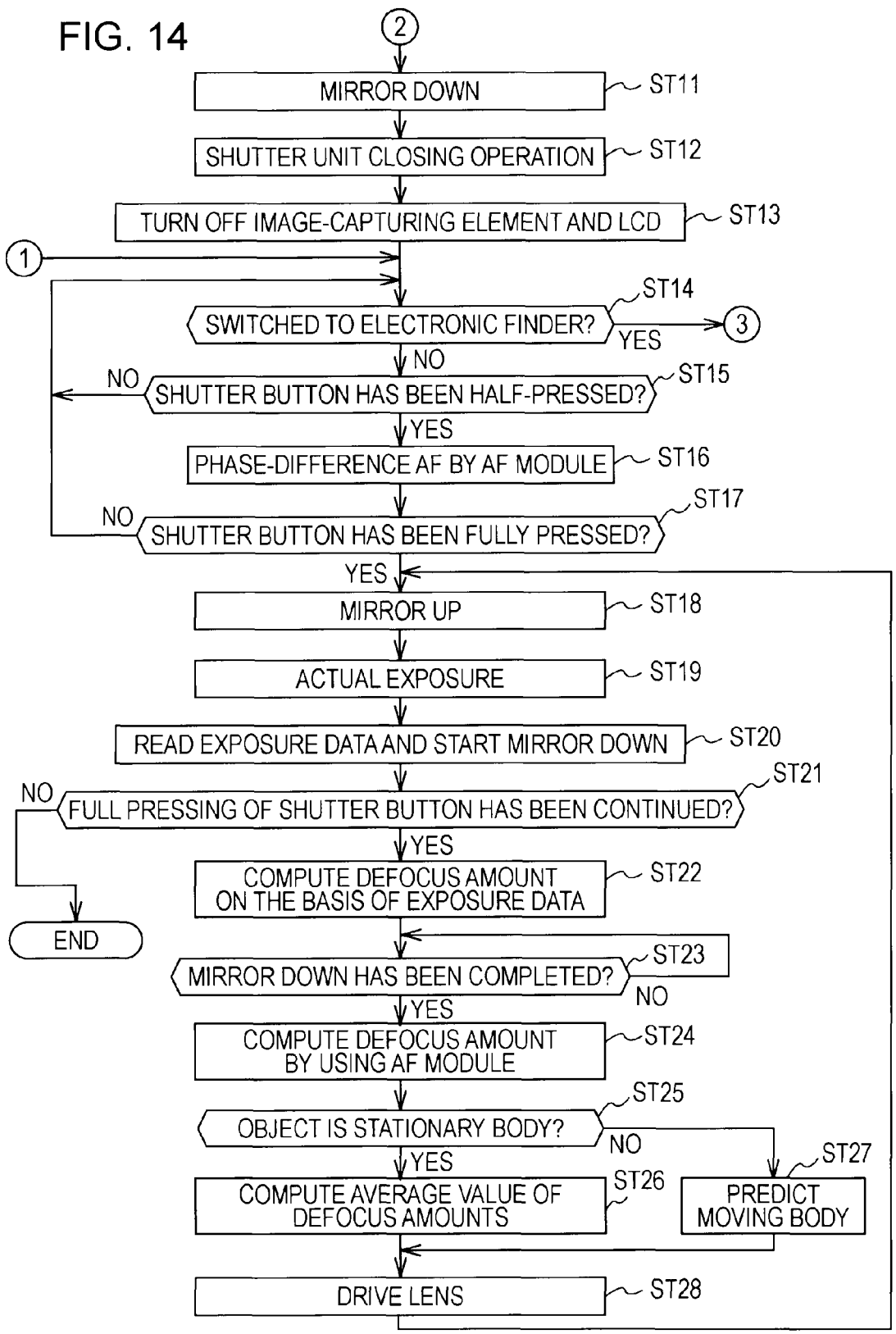
FIG. 14 is a flowchart showing the basic operation of the image-capturing apparatus 1A.

FIGS. 13 and 14 are flowcharts showing the basic operations of the image-capturing apparatus 1A. These operations show a series of operations from when the power supply of the image-capturing apparatus 1A is switched on until single image capturing or continuous image capturing is completed, and is performed by the central controller 62A.

When the main switch 317 is operated by the user and the power supply of the image-capturing apparatus 1A is switched on, it is determined whether or not the electronic finder (the live-view mode) has been selected on the basis of the setting status of the switching switch 85 (step ST1). At this point, in the case where the electronic finder has been selected, the process proceeds to step ST2, and in the case where the optical finder 316 rather than the electronic finder has been selected, the process proceeds to step ST14.

In step ST2, the mirror driving actuator 72M is driven by the mirror driving controller 72A, so that a main mirror 1031 and a sub-mirror 1032 in the mirror unit 103 are tilted up (see FIG. 4).

In step ST3, the shutter driving actuator 73M is driven by the shutter driving controller 73A, thereby performing a closing operation of the shutter unit 40.

In step ST4, the image-capturing element 101 is started up in the live-view mode. That is, the image-capturing element 101 is started up with the reading period of the image-capturing element 101 being set at, for example, 1/60 seconds. As a result, a live-view display on the LCD 311 is started.

In step ST5, it is determined whether the finder has been switched to the optical finder 316. More specifically, it is determined whether or not the switching switch 85 has been operated by the user and the optical finder 316 has been selected. At this point, in the case that the finder has been switched to the optical finder 316, the process proceeds to step ST11, and in the case that the finder has not been switched to, the process proceeds to step ST6.

In step ST6, it is determined whether the shutter button 307 has been half-pressed by the user. At this point, in the case that the shutter button 307 has been half-pressed, the process proceeds to step ST7, and in the case that the shutter button 307 has not been half-pressed, the process returns to step ST5.

In step ST7, phase-difference AF by the image-capturing element 101 is performed. More specifically, focus control for computing the defocus amount on the basis of exposure data of the AF line Lf, which is output from the image capturing elements 101 that is sequentially exposed for the purpose of a live-view display, and supplying the driving amount corresponding to the defocus amount to the focus lens 211 so that the focus lens 211 is moved to the in-focus position is performed.

In step ST8, it is determined whether the shutter button 307 has been fully pressed by the user. At this point, in the case that the shutter button 307 has been fully pressed, the process proceeds to step ST9. In the case that the shutter button 307 has not been fully pressed, the process returns to step ST5.

In step ST9, an actual exposure is performed. That is, an actual image-capturing operation for generating exposure data including captured image data for recording is performed by the image-capturing element 101.

In step ST10, exposure data generated by the image-capturing element 101 by the actual exposure in step ST9 is read. The captured image data contained in the read exposure data undergoes processing in the AFE 5 and the image processor 61, and can be recorded in the memory card 67.

In step ST11, the mirror driving actuator 72M is driven by the mirror driving controller 72A so that the main mirror 1031 and the sub-mirror 1032 in the mirror unit 103 are tilted down (see FIG. 3).

In step ST12, the shutter driving actuator 73M is driven by the shutter driving controller 73A so that the operation of closing the shutter unit 40 is performed.

In step ST13, since the optical finder has been selected, the image-capturing element 101 and the LCD 311 that are necessary for the electronic finder are turned off.

In step ST14, it is determined whether the finder has been switched to the electronic finder. More specifically, it is determined whether or not the selector switch 85 has been operated by the user and the electronic finder has been selected. At this point, in the case that the finder has been switched to the electronic finder, the process returns to step ST2. In the case that the finder has not been switched, the process proceeds to step ST15.

In step ST15, it is determined whether the shutter button 307 has been half-pressed by the user. At this point, in the case that the shutter button 307 is half-pressed, the process proceeds to step ST16, and in the case that the shutter button 307 has not been half-pressed, the process returns to step ST14.

In step ST16, phase-difference AF by the phase-difference AF module 107 is performed.

In step ST17, it is determined whether the shutter button 307 has been fully pressed by the user. At this point, in the case that the shutter button 307 is fully pressed, the process proceeds to step ST18, and in the case that the shutter button 307 has not been fully pressed, the process returns to step ST14.

In step ST18, the mirror driving actuator 72M is driven by the mirror driving controller 72A so that the main mirror 1031 and the sub-mirror 1032 in the mirror unit 103 are tilted up (see FIG. 4).

In step ST19, an actual exposure is performed. As a result of the actual exposure, during single image capturing or continuous image capturing, captured image data (image signal) related to an object image is generated in the pixel arrangement of the ordinary pixels 110 in the image-capturing element 101 and also, exposure data (predetermined signal) for focus detection is generated in the AF line (focus detection pixel sequence) Lf.

In step ST20, exposure data generated by the image-capturing element 101 by the actual exposure in step ST19 is read. As a result, during actual exposures in the continuous image capturing, captured image data (image signal) can be output from the pixel arrangement of the ordinary pixels 110 in the image-capturing element 101 and also, exposure data (pixel sequence signal) for focus detection can be output from the AF line (focus detection pixel sequence) Lf.

In step ST20, the mirror driving actuator 72M is driven by the mirror driving controller 72A so that an operation for tilting down the main mirror 1031 and the sub-mirror 1032 in the mirror unit 103 is started.

In step ST21, it is determined whether the full pressing of the shutter button 307, which is detected in step ST17, has been continued. That is, it is determined whether or not next image capturing related to continuous image capturing exists. At this point, in the case that the full pressing of the shutter button 307 has been continued, the process proceeds to step ST22, and in the case that the full pressing has been released, this flow is completed.

In step ST22, on the basis of the exposure data read in step ST20, the defocus amount related to the image-capturing object is computed. More specifically, on the basis of the exposure data of the AF line Lf, which is output from the image-capturing element 101 during actual exposures in the continuous image capturing, the above-described phase-difference AF is performed and the defocus amount (the first defocus amount) is determined.

In step ST23, it is determined whether the operation for tilting down the main mirror 1031 and the sub-mirror 1032, which was started in step ST20, is completed. At this point, in the case that the down operation is completed, the process proceeds to step ST24, and in the case that the down operation is not completed, step ST23 is repeated.

In step ST24, the defocus amount related to the image-capturing object is computed by phase-difference detection using the phase-difference AF module 107. More specifically, as shown in FIG. 12, an exposure (another exposure) Pa to the phase-difference AF module 107 is performed during intervals between the actual exposures P1 and P2 by the down driving Kd of the mirror unit 103, and phase-difference AF based on exposure data (specific signal) for focus detection, which is generated by a pair of line sensors of the phase-difference AF module 107, is performed, thereby determining the defocus amount (the second defocus amount).

In step ST25, it is determined whether the object is a stationary body. At this point, in the case that the object is a stationary body, the process proceeds to step ST26, and in the case that the object is not a stationary body but a moving body, the process proceeds to step ST27.

In step ST26, an average value of the first defocus amount obtained in step ST22 and the second defocus amount obtained in step ST24 is computed.

In step ST27, the above-described moving body prediction is performed on the basis of the first defocus amount obtained in step ST22 and the second defocus amount obtained in step ST24. That is, when it is determined in step ST25 that the object is a moving body, on the basis of the first defocus amount computed in step ST22 and the second defocus amount computed in step ST24 after that, the focus position (in-focus position) at the next actual exposure with respect to the actual exposure (actual exposure for this time), which was the basis of the computation of the first defocus amount, is predicted.

In step ST28, by driving the focus lens 211 on the basis of the average value of the defocus amounts computed in step ST26 or on the basis of the focus position predicted in step ST27, focus control in response to the motion of the object is performed. That is, on the basis of the defocus amount (the first focus detection result) computed in step ST22 and the defocus amount (the second focus detection result) computed in step ST24, focus adjustment is performed during intervals between actual exposures in the continuous image capturing.

As a result of the above-described operations of the image-capturing apparatus 1A, AF control for driving the focus lens 211 is performed on the basis of the first defocus amount obtained by phase-difference detection based on exposure data generated in the AF line Lf of the image-capturing element 101 at the time of each actual exposure in the continuous image capturing and the second defocus amount obtained by exposing the phase-difference AF module 107 during intervals between actual exposures. Therefore, phase-difference AF during continuous image capturing can be performed with high accuracy while suppressing a decrease in the continuous capturing speed.

Second Embodiment

An image-capturing apparatus 1B according to a second embodiment of the present invention has a configuration similar to that of the image-capturing apparatus 1A of the first embodiment shown in FIGS. 1 to 5, but the configuration of the central controller differs.

That is, a central controller 62B of the image-capturing apparatus 1B has stored therein control programs for performing AF operations at the time of continuous image capturing to be described next.

AF Operation During Continuous Image Capturing

Figure 15:
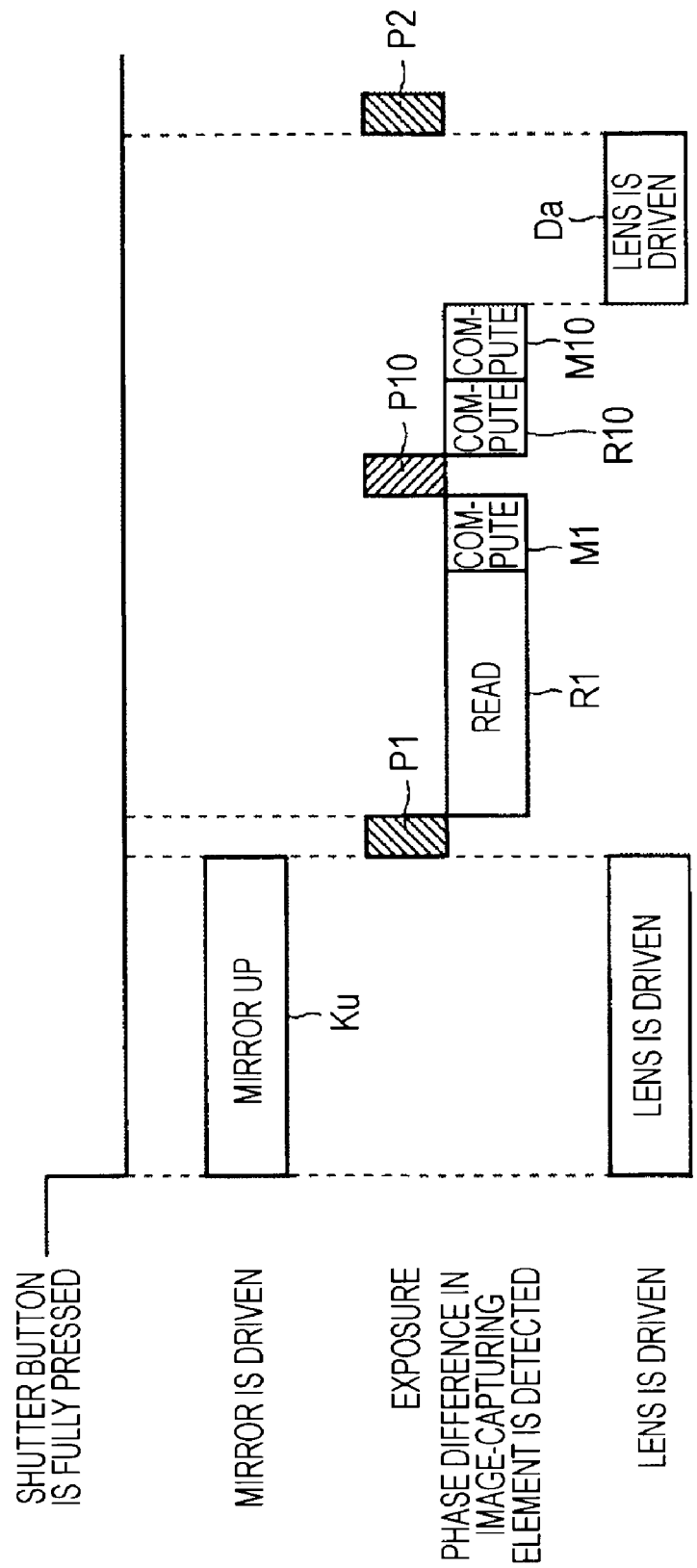
FIG. 15 is a timing chart illustrating an AF operation at the time of continuous image capturing in an image-capturing apparatus 1B.

FIG. 15 is a timing chart illustrating an AF operation at the time of continuous image capturing in the image-capturing apparatus 1B.

Also, in the image-capturing apparatus 1B, similarly to the above-described image-capturing apparatus 1A, phase-difference AF based on exposure data (actual exposure data) of the image-capturing element 101 that is actually exposed in the continuous image capturing can be performed. However, whereas in the image-capturing apparatus 1A of the first embodiment, AF accuracy is improved by performing phase-difference AF using the phase-difference AF module 107 after phase-difference AF based on actual exposure data, in the image-capturing apparatus 1B of the second embodiment, AF accuracy is improved by performing phase-difference AF based on exposure data obtained by performing an exposure for a live-view display on the image-capturing element 101 after phase-difference AF based on actual exposure data. The AF operation during continuous capturing in the image-capturing apparatus 1B will be described below.

When the shutter button 307 is fully pressed, first, the up driving Ku of the mirror unit 103 is performed and thereafter, a first actual exposure P1 is performed by the image-capturing element 101 that has received object light from the interchangeable lens 2. In the image-capturing apparatus 1B, unlike in the first embodiment, the down driving Ku of the mirror unit 103 after the actual exposure P1 is not performed.

Next, reading of the charge signals (exposure data) (reading of all the pixels) R1 of all the pixels, which are generated by the image-capturing element 101 as a result of the actual exposure P1, is performed. The phase-difference AF computation circuit 77 performs a computation process M1 of phase-difference AF based on pixel data of the AF line Lf, which is contained in the exposure data read by the reading of all the pixels R1, thereby determining the defocus amount.

When the computation process M1 is completed, an exposure P10 of the image-capturing element 101 for a live-view display is performed. Then, reduced reading R10 of the exposure data generated by the image-capturing element 101 as a result of the exposure P10 is performed. Also, a computation process M10 of phase-difference AF based on pixel data of the AF line Lf, which is contained in the exposure data read by the reduced reading R10, is performed by the phase-difference AF computation circuit 77, thereby determining the defocus amount. In the reduced reading R10, all the charge signals of the AF pixels 11f constituting the AF line Lf are read without being reduced, but the charge signals (image signals) of the ordinary pixels 110 constituting the Gr line L1 and the Gb line L2 are reduced in number and read. As a result, with a live-view display based on image signals that are read in a reduced manner being performed on the LCD 311, it is possible for the user to visually recognize the object during continuous capturing.

Then, lens driving Da for driving the focus lens 211 to the in-focus position is performed on the basis of the defocus amount (the first defocus amount) determined by the computation process M1 and the defocus amount (the second defocus amount) determined by the computation process Ma. For the lens driving Da, an operation similar to that of the first embodiment is performed.

That is, when the object is a stationary body, whereas lens driving Da based on an average value such that the first defocus amount and the second defocus amount are averaged is performed, when the object is a moving body, lens driving Da for moving the focus lens 211 to the focus position at the time of a second actual exposure P2, which is derived by performing moving body prediction on the basis of the first defocus amount and the second defocus amount, which are obtained at different timings, is performed.

As a result of the lens driving Da described above, similarly to the first embodiment, an actual exposure P2 related to second image capturing is performed in a satisfactory focused state. Even when third or subsequent image capturing is to be performed, as result of operations similar to the lens driving Da based on the first and second defocus amounts described above being performed during intervals between the actual exposures, focus adjustment by high-accuracy phase-difference AF is performed.

As described above, first phase-difference detection based on the exposure data of the AF line Lf of the image-capturing element 101, which is generated at the actual exposure, and second phase-difference detection based on the exposure data of the AF line Lf of the image-capturing element 101, which is generated at the exposure for a live-view display, are performed during intervals between actual exposures P1 and P2 at the time of the continuous image capturing. As a consequence, improved accuracy of the phase-difference AF is achieved. In this case, since the driving of the mirror unit 103 for guiding light to the phase-difference AF module 107 becomes unnecessary, high-accuracy phase-difference AF can be performed without decreasing the continuous capturing speed.

In the following, a description will be given of the basic operation of the image-capturing apparatus 1B for performing AF operations at the time of the above-described continuous image capturing.

Basic Operation of Image-Capturing Apparatus 1B

Figure 16:
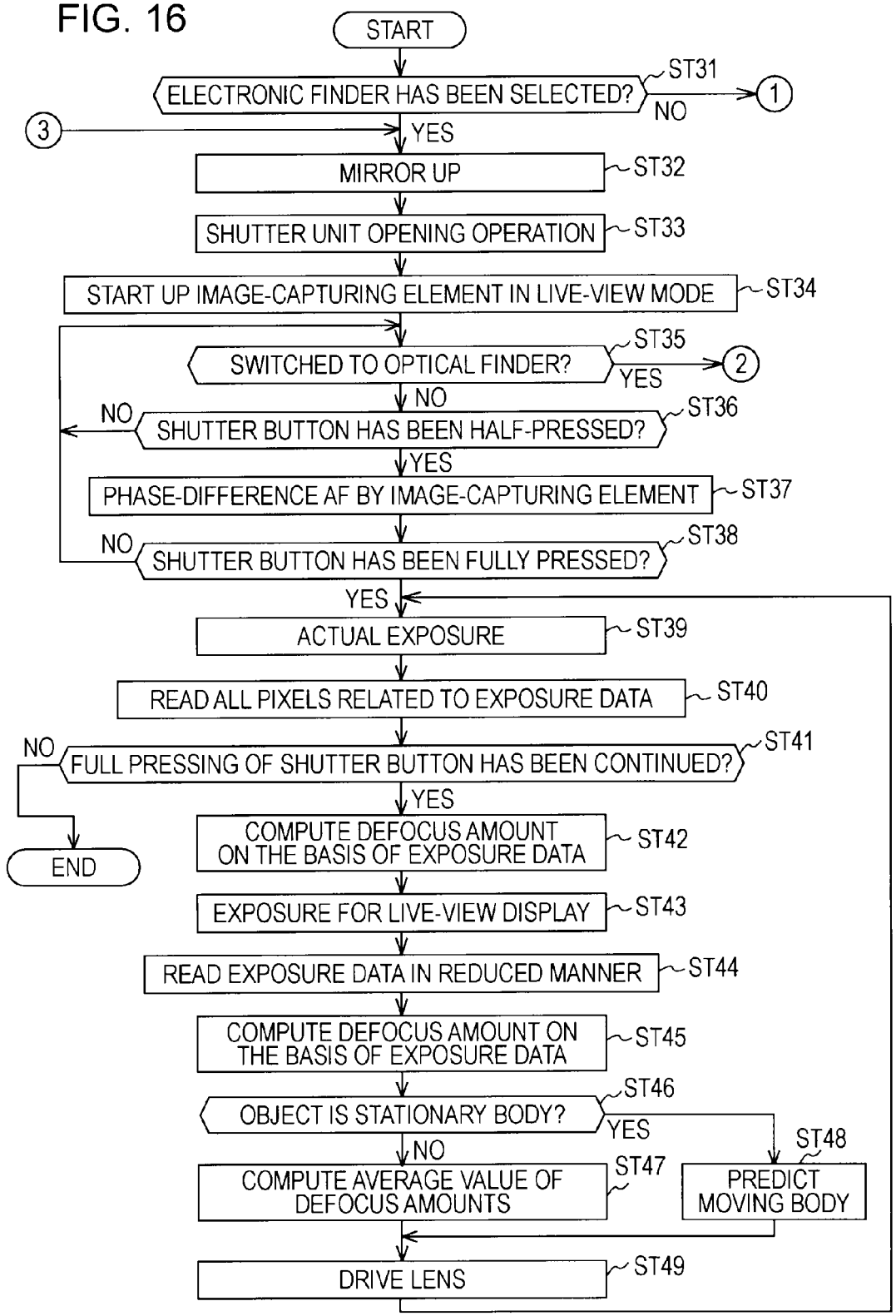
FIG. 16 is a flowchart showing the basic operation of the image-capturing apparatus 1B.
Figure 17:
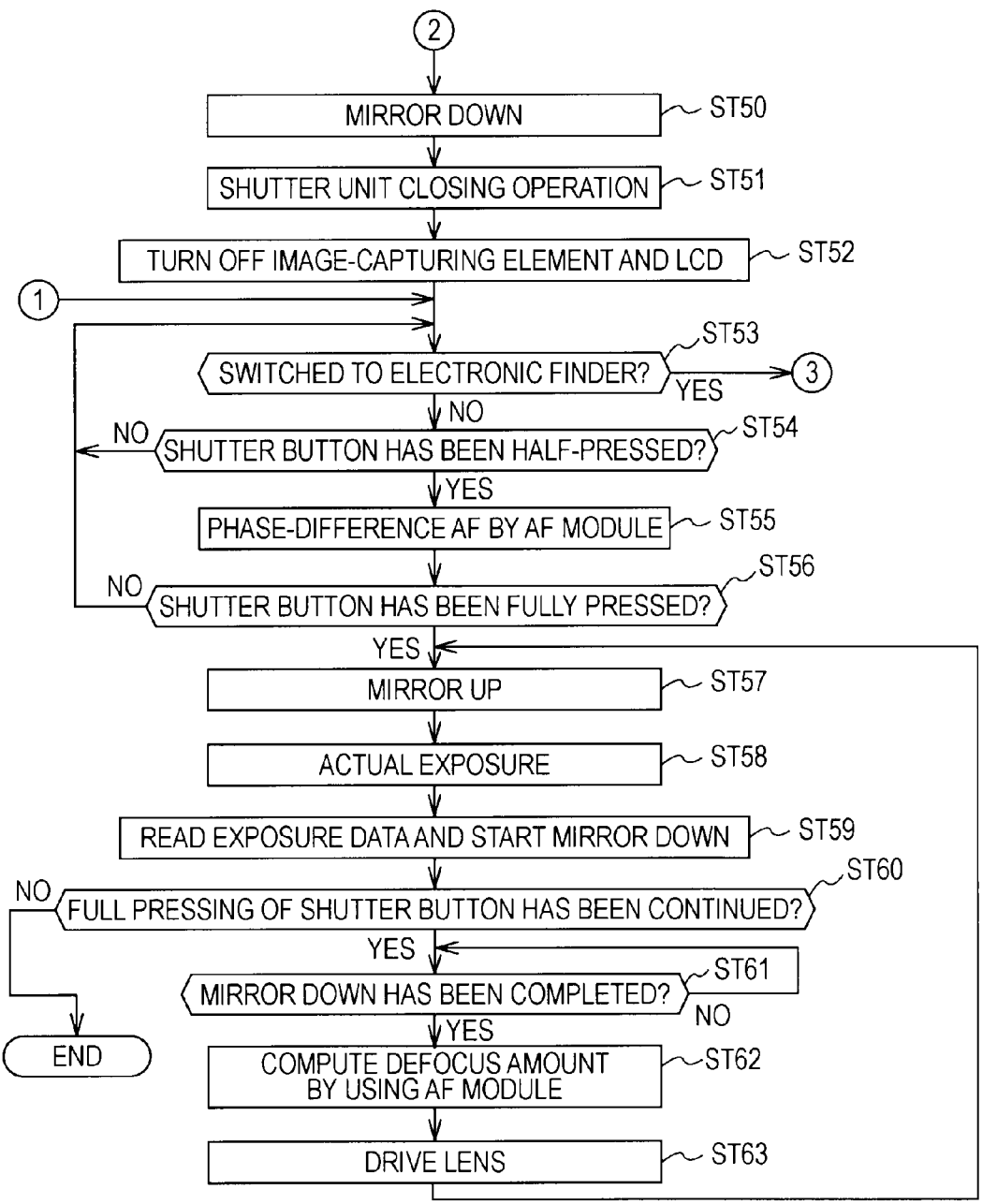
FIG. 17 is a flowchart showing the basic operation of the image-capturing apparatus 1B.
Figure 18:
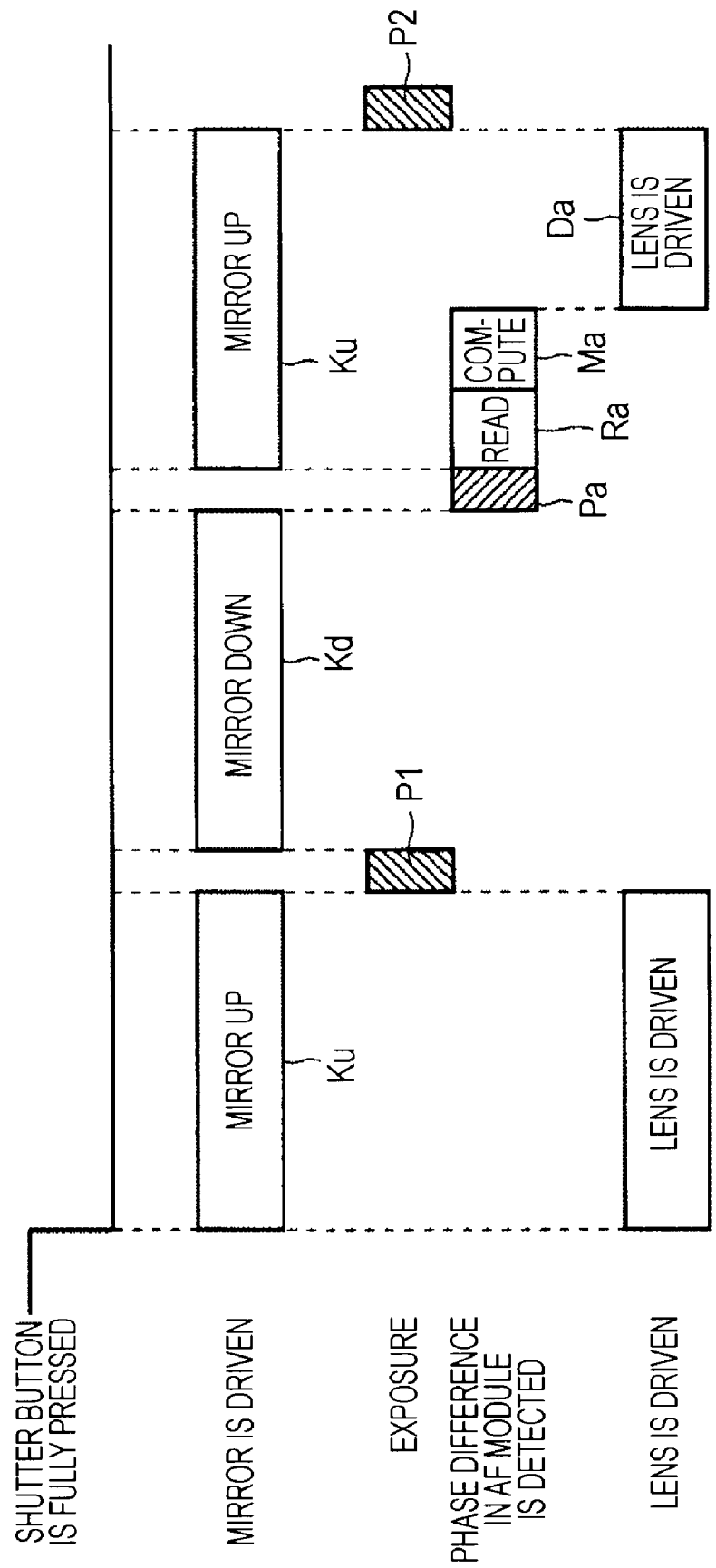
FIG. 18 is a timing chart illustrating an AF operation at the time of continuous image capturing in the related art.

FIGS. 16 and 17 are flowcharts showing basic operations of the image-capturing apparatus 1B. These operations show a series of operations and are performed from when the power supply of the image-capturing apparatus 1B are switched on until single image capturing or continuous image capturing is completed, and are performed by the central controller 62B.

In steps ST31 to ST39, operations similar to steps ST1 to ST9 shown in the flowchart of FIG. 13 are performed.

In step ST40, reading of all the pixels related to the exposure data generated by the image-capturing element 101 as a result of the actual exposure in step ST39 is performed. The captured image data contained in the exposure data obtained by reading all the pixels can be recorded in the memory card 67 after undergoing the processing in the AFE 5 and the image processor 61.

In step ST41, an operation similar to step ST21 shown in the flowchart of FIG. 14 is performed.

In step ST42, on the basis of the exposure data obtained by reading all the pixels in step ST40, the defocus amount related to the image-capturing object is computed. More specifically, the above-described phase-difference AF is performed on the basis of the exposure data (the first signal) of the AF line Lf, which is generated by the image-capturing element 101 at the time of each actual exposure in the continuous image capturing, thereby determining the defocus amount (the first defocus amount).

In step ST43, an exposure for a live-view display is performed. That is, in order to obtain a live-view image to be displayed on the LCD 311 at the time of continuous image capturing, exposure (another exposure) to the image-capturing element 101 is performed during intervals between actual exposures. As a result, image data (image signal) for a live-view display is generated in a pixel arrangement of the ordinary pixels 110 in the image-capturing element 101 and also, exposure data (second signal) for focus detection is generated in the AF line (the focus detection pixel sequence) Lf.

In step ST44, reduced reading of the exposure data generated by the image-capturing element 101 as a result of the exposure for a live-view display in step ST43 is performed. As described above, by performing reduced reading of the exposure data of the image-capturing elements 101, which is sequentially generated as a result of the exposure for a live-view display, and by causing an image based on the read exposure data (image signal) to be displayed on the LCD 311, an appropriate live-view display during continuous image capturing is made possible.

In step ST45, on the basis of the exposure data that has been read in a reduced manner, the defocus amount is computed. More specifically, on the basis of the exposure data (second signal) of the AF line Lf, which is generated by the image-capturing element 101 during intervals between actual exposures in the continuous image capturing, the above-described phase-difference AF is performed and the defocus amount (the second defocus amount) is determined.

In steps ST46 to ST49, operations similar to steps ST25 to ST28 shown in the flowchart of FIG. 14 are performed.

In steps ST50 to ST60, operations similar to steps ST11 to ST21 shown in the flowchart of FIG. 14 are performed.

In steps ST61 to ST62, operations similar to steps ST23 to ST24 shown in the flowchart of FIG. 14 are performed.

In step ST63, an operation similar to step ST28 shown in the flowchart of FIG. 14 is performed.

As a result of the above-described operations of the image-capturing apparatus 1B, on the basis of the first defocus amount obtained by phase-difference detection based on the exposure data generated in the AF line Lf of the image-capturing element 101 at the time of each actual exposure in the continuous image capturing and the second defocus amount obtained by phase-difference detection based on the exposure data generated in the AF line Lf of the image-capturing element 101 by the exposure for a live-view display during intervals between actual exposures, AF control for driving the focus lens 211 is performed. As a consequence, phase-difference AF during continuous image capturing can be performed with high accuracy while suppressing a decrease in the continuous capturing speed.

Modification

In the image-capturing apparatus of each of the embodiments, it is not necessary that the functions of the optical finder and the electronic finder are provided and can be selected, and only the function of the optical finder may be provided. Also, in this case, if second phase-difference AF based on exposure data obtained by the AF pixels 11f of the image-capturing element 101 at the time of each actual exposure in the continuous image capturing and exposure data obtained by the exposure to the phase-difference AF module 107, which is performed during intervals between actual exposures is performed, phase-difference AF during continuous image capturing can be performed with high accuracy while suppressing a decrease in the continuous capturing speed.

Regarding AF pixels in each of the above-described embodiments, it is not necessary that they are arranged in the horizontal direction as shown in FIG. 7, and they may be arranged in the vertical direction. In this case, phase-difference AF is performed on the basis of the shift amount in the vertical direction, which is related to a pair of image sequences (an image sequence of sequence a and an image sequence of sequence b) obtained in the AF pixels.

It should be understood by those skilled in the art that various modifications, combinations, sub-combinations and alterations may occur depending on design requirements and other factors insofar as they are within the scope of the appended claims or the equivalents thereof.

What is claimed is:

1. An image-capturing apparatus comprising:
an image-capturing optical system;
a sensor unit having a pair of line sensors that receive light fluxes of an object, which have been transmitted through a pair of partial areas in an exit pupil of the image-capturing optical system;
image-capturing elements having a pixel arrangement capable of generating an image signal related to object light that has been transmitted through the image-capturing optical system, and a focus detection pixel sequence, in which two or more pairs of pixels that receive the light fluxes of an object, which have been transmitted through a pair of partial areas in an exit pupil of the image-capturing optical system, are arranged in a predetermined direction;

continuous image-capturing means for performing continuous image capturing of actually exposing the image-capturing elements in sequence, thereby generating the image signal in the pixel arrangement at the time of each actual exposure, and for generating a predetermined signal in the focus detection pixel sequence;

signal generation means for performing another exposure for the sensor unit during intervals between actual exposures, thereby generating specific signals in the pair of line sensors;

first focus detection means for performing focus detection of a phase-difference detection method on the basis of the predetermined signal generated by the actual exposure;

second focus detection means for performing focus detection of the phase-difference detection method on the basis of the specific signal generated by the other exposure; and focus adjustment means for performing focus adjustment during intervals between actual exposures on the basis of a first focus detection result obtained by the first focus detection means and a second focus detection result obtained by the second focus detection means.

2. The image-capturing apparatus according to claim 1, further comprising determination means for determining whether or not the object is a stationary body, wherein the first focus detection result and the second focus detection result are detection results related to a defocus amount, wherein the focus adjustment means includes computation means for computing, when it is determined by the determination means that the object is a stationary body, an average value of the defocus amount related to the first focus detection result and the defocus amount related to the second focus detection result; and means for performing focus adjustment on the basis of the average value.

3. The image-capturing apparatus according to claim 1, further comprising determination means for determining whether or not the object is a moving body, wherein the focus adjustment means includes prediction means for predicting, when it is determined by the determination means that the object is a moving body, a focus position at the time of the next actual exposure in the continuous image capturing on the basis of the first focus detection result and the second focus detection result; and means for performing focus adjustment on the basis of the focus position predicted by the prediction means.

4. An image-capturing apparatus comprising:

an image-capturing optical system;

image-capturing elements having a pixel arrangement capable of generating an image signal related to object light that has been transmitted through the image-capturing optical system, and a focus detection pixel sequence, in which two or more pairs of pixels that receive light fluxes of an object that has been transmitted through a pair of partial areas in an exit pupil of the image-capturing optical system, are arranged in a predetermined direction;

continuous image-capturing means for performing continuous image capturing of actually exposing the image-capturing elements in sequence, thereby generating the image signal in the pixel arrangement at the time of each actual exposure, and for generating a first signal in the focus detection pixel sequence;

signal generation means for performing another exposure for the image-capturing elements during intervals between actual exposures, thereby generating a second signal in at least the focus detection pixel sequence;

first focus detection means for performing focus detection of a phase-difference detection method on the basis of the first signal generated by the actual exposure;

second focus detection means for performing focus detection of the phase-difference detection method on the basis of the second signal generated by the other exposure; and focus adjustment means for performing focus adjustment during intervals between actual exposures on the basis of a first focus detection result obtained by the first focus detection means and a second focus detection result obtained by the second focus detection means.

5. The image-capturing apparatus according to claim 4, further comprising determination means for determining whether or not the object is a stationary body, wherein the first focus detection result and the second focus detection result are detection results related to a defocus amount, and wherein the focus adjustment means includes computation means for computing, when it is determined by the determination means that the object is a stationary body, an average value of the defocus amount related to the first focus detection result and the defocus amount related to the second focus detection result; and means for performing focus adjustment on the basis of the average value.

6. The image-capturing apparatus according to claim 4, further comprising determination means for determining whether or not the object is a moving body, wherein the focus adjustment means includes prediction means for predicting, when it is determined by the determination means that the object is a moving body, a focus position at the time of the next actual exposure in the continuous image capturing on the basis of the first focus detection result and the second focus detection result; and means for performing focus adjustment on the basis of the focus position predicted by the prediction means.

7. The image-capturing apparatus according to claim 4, further comprising display control means for allowing an image based on the image signal to be displayed on predetermined display means, wherein the signal generation means performs the other exposure during intervals between actual exposures, thereby generating an image signal in the pixel arrangement, and wherein the display control means includes means for allowing an image based on image signals that are sequentially generated by the other exposure to be displayed on the predetermined display means at the time of the continuous image capturing.

8. An image-capturing apparatus comprising:

an image-capturing optical system;

a sensor unit having a pair of line sensors that receive light fluxes of an object, which have been transmitted through a pair of partial areas in an exit pupil of the image-capturing optical system;

image-capturing elements having a pixel arrangement capable of generating an image signal related to object light that has been transmitted through the image-capturing optical system, and a focus detection pixel sequence, in which two or more pairs of pixels that receive the light fluxes of an object, which have been transmitted through a pair of partial areas in an exit pupil of the image-capturing optical system, are arranged in a predetermined direction;

a continuous image-capturing unit configured to perform continuous image capturing of actually exposing the image-capturing elements in sequence, thereby generating the image signal in the pixel arrangement at the time of each actual exposure, and for generating a predetermined signal in the focus detection pixel sequence;

a signal generation unit configured to perform another exposure for the sensor unit during intervals between actual exposures, thereby generating specific signals in the pair of line sensors;

a first focus detection unit configured to perform focus detection of a phase-difference detection method on the basis of the predetermined signal generated by the actual exposure;

a second focus detection unit configured to perform focus detection of the phase-difference detection method on the basis of the specific signal generated by the other exposure; and a focus adjustment unit configured to perform focus adjustment during intervals between actual exposures on the basis of a first focus detection result obtained by the first focus detection unit and a second focus detection result obtained by the second focus detection unit.

9. An image-capturing apparatus comprising:

an image-capturing optical system;

image-capturing elements having a pixel arrangement capable of generating an image signal related to object light that has been transmitted through the image-capturing optical system, and a focus detection pixel sequence, in which two or more pairs of pixels that receive light fluxes of an object that has been transmitted through a pair of partial areas in an exit pupil of the image-capturing optical system, are arranged in a predetermined direction;

a continuous image-capturing unit configured to perform continuous image capturing of actually exposing the image-capturing elements in sequence, thereby generating the image signal in the pixel arrangement at the time of each actual exposure, and for generating a first signal in the focus detection pixel sequence;

a signal generation unit configured to perform another exposure for the image-capturing elements during intervals between actual exposures, thereby generating a second signal in at least the focus detection pixel sequence;

a first focus detection unit configured to perform focus detection of a phase-difference detection method on the basis of the first signal generated by the actual exposure;

a second focus detection unit configured to perform focus detection of the phase-difference detection method on the basis of the second signal generated by the other exposure; and a focus adjustment unit configured to perform focus adjustment during intervals between actual exposures on the basis of a first focus detection result obtained by the first focus detection unit and a second focus detection result obtained by the second focus detection unit.

* * * * *